US008817096B1

(12) United States Patent
Ni et al.

(10) Patent No.: US 8,817,096 B1
(45) Date of Patent: Aug. 26, 2014

(54) IMAGING SYSTEMS AND METHODS FOR GENERATING IMAGE DATA

(75) Inventors: Melvin S. Ni, Cupertino, CA (US); Joe Marron, Broomfield, CO (US); James Wes Irwin, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 515 days.

(21) Appl. No.: 12/820,539

(22) Filed: Jun. 22, 2010

Related U.S. Application Data

(60) Provisional application No. 61/219,361, filed on Jun. 22, 2009.

(51) Int. Cl.
*H04N 7/18* (2006.01)

(52) U.S. Cl.
USPC .......................................................... 348/144

(58) Field of Classification Search
CPC .. H04N 7/18; G01B 9/02084; G01B 9/02043; G03H 1/0443; G03H 1/08; G03H 1/265; G01S 17/895; G01J 3/45; G01J 3/453
USPC .......................................................... 348/144
IPC .......................................................... H04N 7/18
See application file for complete search history.

(56) References Cited

U.S. PATENT DOCUMENTS

| | | | | |
|---|---|---|---|---|
| 7,034,945 B2 * | 4/2006 | Kendrick et al. | ............. | 356/456 |
| 7,405,834 B1 * | 7/2008 | Marron et al. | ................ | 356/521 |
| 7,474,332 B2 * | 1/2009 | Byren | ........................... | 348/169 |
| 7,924,430 B2 * | 4/2011 | Georges, III | .................. | 356/489 |
| 7,999,922 B1 * | 8/2011 | Cochrane et al. | ............ | 356/4.01 |
| 8,068,235 B1 * | 11/2011 | Marron et al. | ................ | 356/512 |
| 8,309,900 B1 * | 11/2012 | Marron | ...................... | 250/208.1 |
| 2006/0180739 A1 * | 8/2006 | Chalfant et al. | ........... | 250/203.2 |

OTHER PUBLICATIONS

Distributed Aperture Active Imaging, Marron, Joseph C., Kendrick, Richard L., Proc. of SPIE 6550, Laser Radar Technology and Applications XII 65500A, Apr. 27, 2007.*

Extracting Wavefront Error From Shack-Hartmann Images Using Spatial Demodulation, Sarver, Edwin J., Schwiegerling, Jim, Applegate Raymond A., NIH Public Access Author Manuscript, Nov. 20006.*

(Continued)

*Primary Examiner* — Jay Patel
*Assistant Examiner* — Francis G Geroleo
(74) *Attorney, Agent, or Firm* — McDermott Will & Emery LLP

(57) ABSTRACT

An imaging system having a first laser emitting a light beam to illuminate the object is provided. The system includes first and second beam splitters. The first beam splitter combines a first light beam portion and a third light beam portion emitted from a second laser to form a first interference pattern. The second beam splitter combines a second light beam portion and a fourth light beam portion to form a second interference pattern. The system includes digital cameras generating raw image data based on the first and second interference patterns, and a computer processing the raw image data to obtain synthetic image plane data.

20 Claims, 20 Drawing Sheets

(56) References Cited

OTHER PUBLICATIONS

Joseph C. Marron & Richard L. Kendrick; Lockheed Martin Coherent Technologies; Louisville, CO; "Multi-Aperture 3D Imaging Systems"; May 7, 2009; pp. 1-3.

Mel S. Ni and J. Wes Irwin; Lockheed Martin Space Systems Company, Advanced Technology Center; Palo Alto, CA; "Optical synthetic aperture imaging with spatial heterodyne interferometry"; Proc. of SPIE vol. 7468; Oct. 6, 2009; 8 pages.

Renaud, et al.; "Short-range synthetic aperture imaging at 633 nm by digital holography"; Applied Optics; Aug. 10, 2002; vol. 41, No. 23; pp. 4775-4782.

Jennifer Ricklin, et al.; "Synthetic Aperture Ladar for Tactical Imaging (SALTI)"; Strategic Technology Office; Publication date unknown; inventor accessed document on the internet on Jun. 2008.

"Synthetic aperture radar"; http://en.wikipedia.org/wiki/Synthetic_aperture_radar; May 18, 2010; pp. 1-9.

* cited by examiner

US 8,817,096 B1

IMAGING SYSTEMS AND METHODS FOR GENERATING IMAGE DATA

CROSS-REFERENCE TO RELATED APPLICATION

This patent application claims priority to U.S. Provisional Patent Application Ser. No. 61/219,361, filed Jun. 22, 2009, entitled "COMBINATION OF MULTIPLE APERTURE AND SYNTHETIC APERTURE HOLOGRAPHIC IMAGING LADAR" and which is incorporated by reference herein, in its entirety.

BACKGROUND OF THE INVENTION

Systems have been developed to generate images of objects. However, the resolution of an image of an object is limited by a fixed diameter of a telescope aperture receiving light from the object.

Accordingly, it is desirable to have an improved imaging system that generates a high-resolution image of an object.

SUMMARY OF THE INVENTION

An imaging system for generating synthetic image plane data associated with an object is provided. The imaging system includes a first laser configured to emit a light beam to illuminate the object. The imaging system further includes first and second afocal telescopes configured to collimate and condense first and second light beam portions, respectively, reflected from the object at the first and second times, respectively, when the imaging system is at first and second positions, respectively. The imaging system further includes a first beam splitter configured to combine the first light beam portion from the first afocal telescope and a third light beam portion emitted from a second laser to form a first interference pattern. The imaging system further includes a second beam splitter configured to combine the second light beam portion from the second afocal telescope and a fourth light beam portion emitted from the second laser to form a second interference pattern. The imaging system further includes a first digital camera configured to receive the first interference pattern and to generate first raw image data based on the first interference pattern. The imaging system further includes a second digital camera configured to receive the second interference pattern and to generate second raw image data based on the second interference pattern. The imaging system further includes a computer configured to process the first and second raw image data to obtain first combined complex synthetic pupil data. The computer is further configured to process the first combined complex synthetic pupil data to generate first synthetic image plane data corresponding to the object.

A method for generating synthetic image plane data associated with an object is provided. The method includes emitting a light beam to illuminate the object utilizing a first laser. The method further includes collimating and condensing first and second light beam portions utilizing first and second afocal telescopes, respectively, reflected from the object at first and second times, respectively, when the imaging system is at first and second positions, respectively. The method further includes combining the first light beam portion from the first afocal telescope and a third light beam portion emitted from a second laser to form a first interference pattern utilizing a first beam splitter. The method further includes combining the second light beam portion from the second afocal telescope and a fourth light beam portion emitted from the second laser to form a second interference pattern utilizing a second beam splitter. The method further includes receiving the first interference pattern and generating first raw image data based on the first interference pattern utilizing a first digital camera. The method further includes receiving the second interference pattern and generating second raw image data based on the second interference pattern utilizing a second digital camera. The method further includes processing the first and second raw image data to obtain first combined complex synthetic pupil data utilizing a computer, and processing the first combined complex synthetic pupil data to generate first synthetic image plane data corresponding to the object utilizing the computer.

An imaging system for generating synthetic image plane data associated with an object is provided. The imaging system includes a first laser configured to emit a light beam to illuminate the object. The imaging system further includes a first afocal telescope configured to collimate and condense first and second light beam portions reflected from the object at the first and second times, respectively, when the imaging system is at first and second positions, respectively. The imaging system further includes a first beam splitter configured to combine the first light beam portion from the first afocal telescope and a third light beam portion emitted from a second laser to form a first interference pattern. The first beam splitter is further configured to combine the second light beam portion from the first afocal telescope and a fourth light beam portion emitted from the second laser to form a second interference pattern. The imaging system further includes a first digital camera configured to receive the first and second interference patterns and to generate first and second raw image data, respectively, based on the first and second interference patterns, respectively. The imaging system further includes a computer configured to process the first and second raw image data to obtain first combined complex synthetic pupil data. The computer is further configured to process the first combined complex synthetic pupil data to generate first synthetic image plane data corresponding to the object.

A method for generating synthetic image plane data associated with an object is provided. The method includes emitting a light beam to illuminate the object utilizing a first laser. The method further includes collimating and condensing first and second light beam portions reflected from the object at the first and second times, respectively, when the imaging system is at first and second positions, respectively, utilizing a first afocal telescope. The method further includes combining the first light beam portion from the first afocal telescope and a third light beam portion emitted from a second laser to form a first interference pattern utilizing a first beam splitter, and combining the second light beam portion from the first afocal telescope and a fourth light beam portion emitted from the second laser to form a second interference pattern utilizing the first beam splitter. The method further includes generating first and second raw image data, respectively, based on the first and second interference patterns, respectively, utilizing a first digital camera. The method further includes processing the first and second raw image data to obtain first combined complex synthetic pupil data, utilizing a computer, and processing the first combined complex synthetic pupil data to generate first synthetic image plane data corresponding to the object utilizing the computer.

An imaging system for generating synthetic image plane data associated with an object is provided. The imaging system includes a laser configured to emit a light beam to illuminate the object. The imaging system further includes first and second afocal telescopes configured to collimate and condense first and second light beam portions, respectively, reflected from the object at the first and second times, respectively, when the imaging system is at first and second positions, respectively. The imaging system further includes a first beam splitter configured to combine the first light beam portion from the first afocal telescope and a third light beam portion emitted from the laser to form a first interference pattern. The imaging system further includes a second beam splitter configured to combine the second light beam portion from the second afocal telescope and a fourth light beam portion emitted from the laser to form a second interference pattern. The imaging system further includes a first digital camera configured to receive the first interference pattern and to generate first raw image data based on the first interference pattern. The imaging system further includes a second digital camera configured to receive the second interference pattern and to generate second raw image data based on the second interference pattern. The imaging system further includes a computer configured to process the first and second raw image data to obtain first combined complex synthetic pupil data. The computer is further configured to process the first combined complex synthetic pupil data to generate first synthetic image plane data corresponding to the object.

A method for generating synthetic image plane data associated with an object is provided. The method includes emitting a light beam to illuminate the object utilizing a laser. The method further includes collimating and condensing first and second light beam portions, respectively, reflected from the object at the first and second times, respectively, utilizing first and second afocal telescopes, respectively, when the imaging system is at first and second positions, respectively. The method further includes combining the first light beam portion from the first afocal telescope and a third light beam portion emitted from the laser to form a first interference pattern utilizing a first beam splitter. The method further includes combining the second light beam portion from the second afocal telescope and a fourth light beam portion emitted from the laser to form a second interference pattern utilizing a second beam splitter. The method further includes generating first and second raw image data based on the first and second interference patterns, respectively, utilizing first and second digital cameras, respectively. The method further includes processing the first and second raw image data to obtain first combined complex synthetic pupil data utilizing a computer, and processing the first combined complex synthetic pupil data to generate first synthetic image plane data corresponding to the object utilizing the computer.

An imaging system for generating synthetic image plane data associated with an object is provided. The imaging system includes a laser configured to emit a light beam to illuminate the object. The imaging system further includes a first afocal telescope configured to collimate and condense first and second light beam portions reflected from the object at first and second times, respectively, when the imaging system is at first and second positions, respectively. The imaging system further includes a first beam splitter configured to combine the first light beam portion from the first afocal telescope and a third light beam portion emitted from the laser to form a first interference pattern. The first beam splitter is further configured to combine the second light beam portion from the first afocal telescope and a fourth light beam portion emitted from the laser to form a second interference pattern. The imaging system further includes a first digital camera configured to receive the first and second interference patterns and to generate first and second raw image data, respectively, based on the first and second interference patterns, respectively. The imaging system further includes a computer configured to process the first and second raw image data to obtain first combined complex synthetic pupil data. The computer is further configured to process the first combined complex synthetic pupil data to generate first synthetic image plane data corresponding to the object.

A method for generating synthetic image plane data associated with an object utilizing an imaging system is provided. The method includes emitting a light beam to illuminate the object utilizing a laser. The method further includes collimating and condensing first and second light beam portions reflected from the object at first and second times, respectively, when the imaging system is at first and second positions, respectively, utilizing a first afocal telescope. The method further includes combining the first light beam portion from the afocal telescope and a third light beam portion emitted from the laser to form a first interference pattern, utilizing a first beam splitter, and combining the second light beam portion from the afocal telescope and a fourth light beam portion emitted from the laser to form a second interference pattern, utilizing the first beam splitter. The method further includes generating first and second raw image data based on the first and second interference patterns, respectively, utilizing a first digital camera. The method further includes processing the first and second raw image data to obtain first combined complex synthetic pupil data utilizing a computer, and processing the first combined complex synthetic pupil data to generate first synthetic image plane data corresponding to the object utilizing the computer.

A method for combining image data of an object is provided. The method includes accessing a matrix having first, second, third and fourth raw image data utilizing a computer. The first row of the matrix has the first and second raw image data therein. The second row of the matrix has the third and fourth raw image data therein. A first column of the matrix has the first and third raw image data therein. At least of a portion of the first and second raw image data overlap each other, and at least a portion of the third and fourth raw image data overlap each other. At least a portion of the first and third raw image data overlap each other, and at least a portion of the second and fourth raw image data overlap each other. The method includes generating first, second, third, and fourth complex pupil data based on the first, second, third and fourth raw image data, respectively, utilizing the computer. If first combined synthetic pupil data cannot be generated based on the first and second complex pupil data, then the method further includes generating second combined synthetic pupil data based on the first and third complex pupil data utilizing the computer. Further, the method includes generating third combined complex pupil data based on the third and fourth complex pupil data utilizing the computer. Further, the method includes generating fourth combined complex pupil data based on the second and fourth complex pupil data utilizing the computer. Further, the method includes storing the second, third, and fourth combined synthetic pupil data in a memory device utilizing the computer.

A system for combining image data of an object is provided. The system includes a memory device having a matrix with first, second, third and fourth raw image data stored therein. The first row of the matrix has the first and second raw image data therein. The second row of the matrix has the third and fourth raw image data therein. A first column of the matrix has the first and third raw image data therein. At least of a portion of the first and second raw image data overlap each other, and at least a portion of the third and fourth raw image data overlap each other. At least a portion of the first and third raw image data overlap each other, and at least a portion of the second and fourth raw image data overlap each other. The system further includes a computer operably coupled to the memory device. The computer is configured to generate first, second, third, and fourth complex pupil data based on the first, second, third and fourth raw image data, respectively. If first combined synthetic pupil data cannot be generated based on the first and second complex pupil data, then the computer is further configured to generate second combined synthetic pupil data based on the first and third complex pupil data. The computer is further configured to generate third combined complex pupil data based on the third and fourth complex pupil data. The computer is further configured to generate fourth combined complex pupil data based on the second and fourth complex pupil data. The computer is further configured to store the second, third, and fourth combined synthetic pupil data in the memory device.

A method for combining image data of an object is provided. The method includes accessing a matrix having first, second, third and fourth raw image data utilizing a computer. The first row of the matrix has the first and second raw image data therein. The second row of the matrix has the third and fourth raw image data therein. A first column of the matrix has the first and third raw image data therein. At least of a portion of the first and second raw image data overlap each other, and at least a portion of the third and fourth raw image data overlap each other. At least a portion of the first and third raw image data overlap each other, and at least a portion of the second and fourth raw image data overlap each other. The method further includes generating first, second, third, and fourth complex pupil data based on the first, second, third and fourth raw image data, respectively, utilizing the computer. If first combined synthetic pupil data cannot be generated based on the first and third complex pupil data utilizing the computer, then the method further includes generating second combined synthetic pupil data based on the third and fourth complex pupil data utilizing the computer. The method further includes generating third combined complex pupil data based on the second and fourth complex pupil data utilizing the computer. The method further includes generating fourth combined complex pupil data based on the first and second complex pupil data utilizing the computer. The method further includes storing the second, third, and fourth combined synthetic pupil data in a memory device utilizing the computer.

A system for combining image data of an object is provided. The system includes a memory device having a matrix with first, second, third and fourth raw image data stored therein. The first row of the matrix has the first and second raw image data therein. The second row of the matrix has the third and fourth raw image data therein. A first column of the matrix has the first and third raw image data therein. At least of a portion of the first and second raw image data overlap each other, and at least a portion of the third and fourth raw image data overlap each other. At least a portion of the first and third raw image data overlap each other, and at least a portion of the second and fourth raw image data overlap each other. The system further includes a computer operably coupled to the memory device. The computer is configured to generate first, second, third, and fourth complex pupil data based on the first, second, third and fourth raw image data, respectively. If first combined synthetic pupil data cannot be generated based on the first and third complex pupil data, then the computer is further configured to generate second combined synthetic pupil data based on the third and fourth complex pupil data. The computer is further configured to generate third combined complex pupil data based on the second and fourth complex pupil data. The computer is further configured to generate fourth combined complex pupil data based on the first and second complex pupil data. The computer is further configured to store the second, third, and fourth combined synthetic pupil data in the memory device.

A method for combining image data of an object is provided. The method includes accessing a matrix having first, second, third and fourth raw image data utilizing a computer. The first row of the matrix has the first and second raw image data therein. The second row of the matrix has the third and fourth raw image data therein. A first column of the matrix has the first and third raw image data therein. At least of a portion of the first and second raw image data overlap each other, and at least a portion of the third and fourth raw image data overlap each other. At least a portion of the first and third raw image data overlap each other, and at least a portion of the second and fourth raw image data overlap each other. The method includes generating first, second, third, and fourth complex pupil data based on the first, second, third and fourth raw image data, respectively, utilizing the computer. The method further includes generating first combined synthetic pupil data based on the first and second complex pupil data utilizing the computer. The method further includes generating second combined synthetic pupil data based on the first and third complex pupil data utilizing the computer. The method further includes determining a first correlation value between the third and fourth complex pupil data utilizing the computer. The method further includes determining a second correlation value between the second and fourth complex pupil data utilizing the computer. If the first correlation value is greater than the second correlation value, then the method includes only generating third combined synthetic pupil data based on the third and fourth complex pupil data utilizing the computer. The method further includes storing the first, second, and third combined synthetic pupil data in a memory device utilizing the computer.

A system for combining image data of an object is provided. The system includes a memory device having a matrix with first, second, third and fourth raw image data stored therein. The first row of the matrix has the first and second raw image data therein. The second row of the matrix has the third and fourth raw image data therein. A first column of the matrix has the first and third raw image data therein. At least of a portion of the first and second raw image data overlap each other, and at least a portion of the third and fourth raw image data overlap each other. At least a portion of the first and third raw image data overlap each other, and at least a portion of the second and fourth raw image data overlap each other. The system further includes a computer operably coupled to the memory device. The computer is configured to generate first, second, third, and fourth complex pupil data based on the first, second, third and fourth raw image data, respectively. The computer is further configured to generate first combined synthetic pupil data based on the first and second complex pupil data. The computer is further configured to generate second combined synthetic pupil data based on the first and third complex pupil data. The computer is further configured to determine a first correlation value between the third and fourth complex pupil data. The computer is further configured to determine a second correlation value between the second and fourth complex pupil data. If the first correlation value is greater than the second correlation value, then the computer is further configured to only generate third combined synthetic pupil data based on the third and fourth complex pupil data. The computer is further configured to store the first, second, and third combined synthetic pupil data in the memory device.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
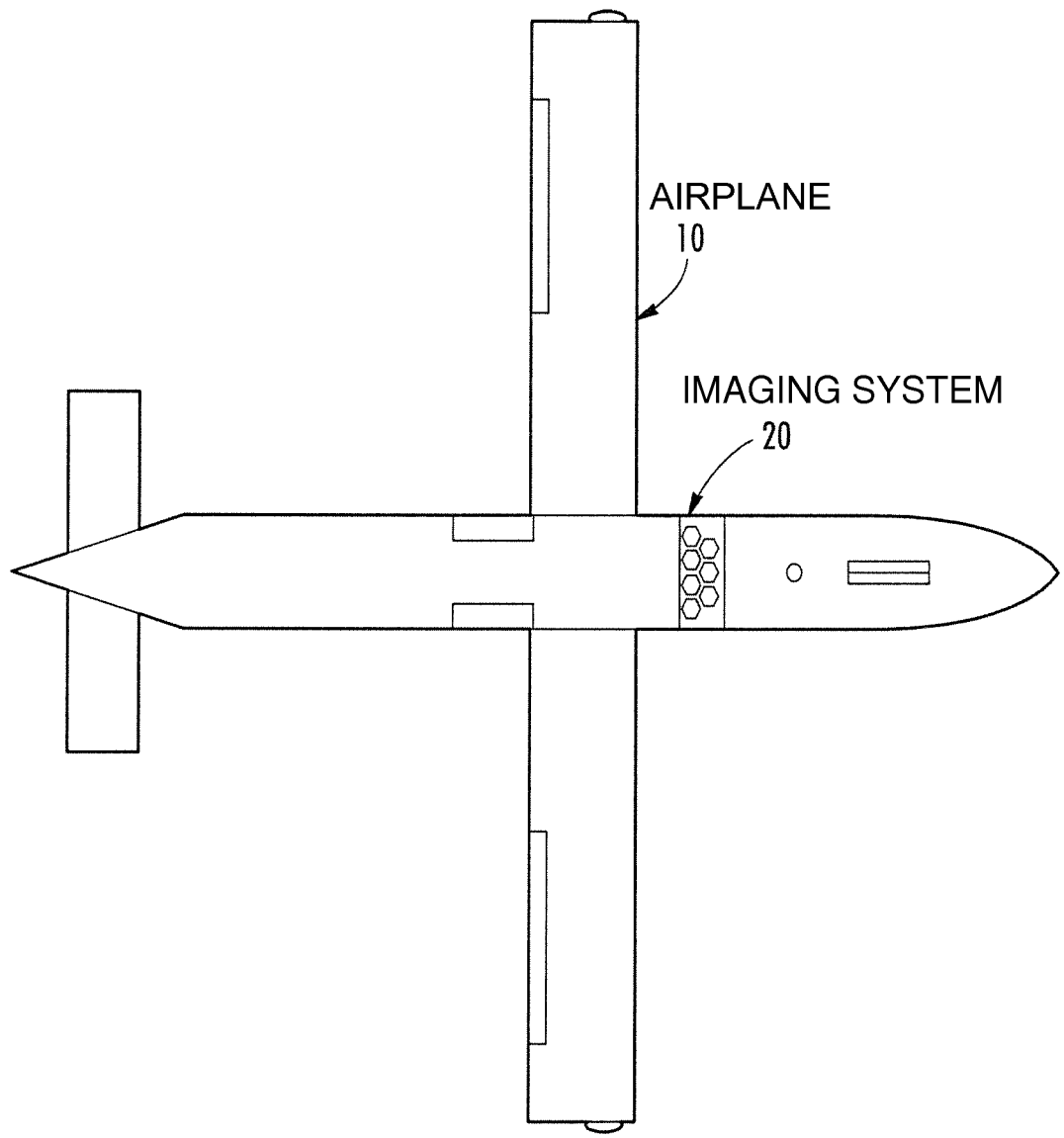
FIG. 1 is a bottom view of an airplane having an imaging system in accordance with the present invention.
Figure 2:
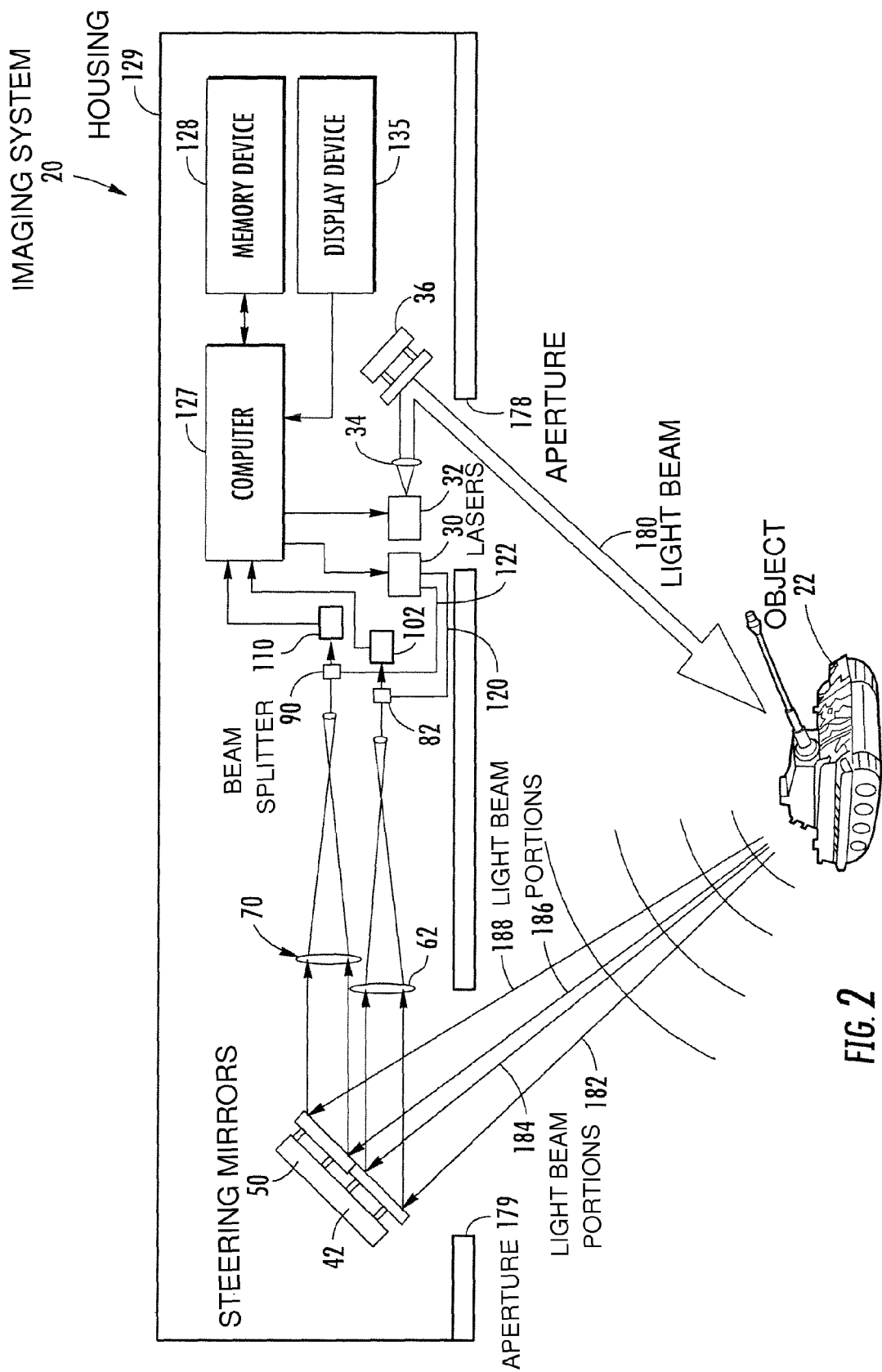
FIG. 2 is a side view of the imaging system of FIG. 1.

Referring to FIGS. 1 and 2, an airplane 10 having an imaging system 20 in accordance with the present invention is illustrated. In particular, the imaging system 20 is configured to generate high-resolution image data associated with remote objects. In the illustrated embodiment, the imaging system 20 is disposed on a moving airplane 10. The imaging system 20 includes two lasers, an array of afocal telescopes, and digital cameras. Each afocal telescope has a corresponding digital camera receiving light therefrom. A first laser emits light to illuminate a remote object and portions of the light beam are reflected back to the imaging system 20. A second laser emits another light beam having a same wavelength as the reflected light beam from a remote object illuminated by the first laser that is routed directly to each of the digital cameras.

When received light beam portions from the remote object are received by the imaging system 20, the received light beam portions interfere with the light beam portions from the second laser and form light interference patterns on the digital cameras. Each digital camera generates raw image data based on a respective interference pattern. The plurality of raw image data generated by the digital cameras are mathematically combined in a computer to create a synthetic aperture (e.g., combined complex synthetic pupil data). Images can be generated having a resolution commensurate with a diameter of the synthetic aperture. It should be noted that a synthetic aperture corresponds to synthetic image plane data generated from light received by a plurality of telescope apertures. The synthetic aperture of the imaging system 20 has a resolution of 1-2 centimeters at a 10 kilometer range, for example.

Figure 3:
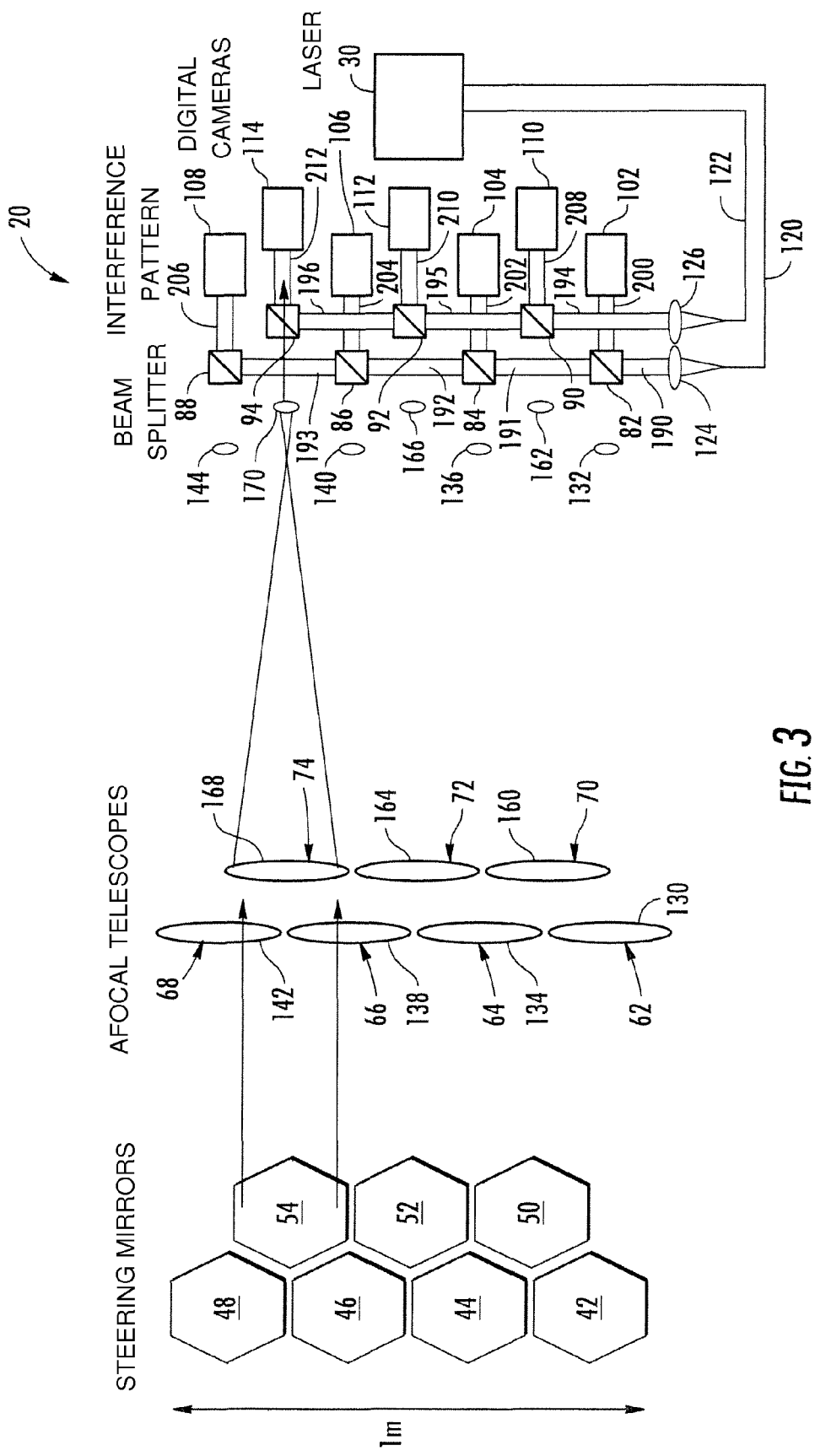
FIG. 3 is an enlarged top view of the imaging system of FIG. 2.

Referring to FIGS. 2 and 3, the imaging system 20 includes lasers 30, 32, collimating lens 34, steering mirrors 36, 42, 44, 46, 48, 50, 52, 54, afocal telescopes 62, 64, 66, 68, 70, 72, 74, beam splitters 82, 84, 86, 88, 90, 92, 94, digital cameras 102, 104, 106, 108, 110, 112, 114, fiber optical cables 120, 122, collimating lens 124, 126, a computer 127, a memory device 128, a display device 135, and a housing 129.

The laser 32 is disposed within the housing 129. The laser 32 is configured to emit a light beam to illuminate an object 22, in response to a control signal from the computer 127. The power level of light beams from the laser 32 is selected to provide a sufficient light beam return signal to the digital cameras. For example, for a 10 kilometer distance between the laser 32 and the remote object 22, a power level of about 10 milli-Joules per pulse could be utilized. The pulse length of light beam pulses is typically 10-100 nano-seconds, with a pulse repetition rate of 1000 Hertz. In alternative embodiments, the laser 32 can be a Q-switch laser or a pulsed-pump laser. Also, the laser 32 could be a mode-lock laser if shorter light beam pulses in the pico-second and femto-second range is desired.

The laser 30 is also disposed within the housing 129. The laser 30 is configured to emit a light beam in response to a control signal from the computer 127. The wavelength of the light beams emitted by the laser 30 is adjusted based on a relative doppler frequency difference between the emitted light beams of the laser 30 and the laser 32 measured by a separate photodetector (not shown) coupled to the computer 127, to correct for a doppler shift in the reflected light beams from the object 22. The power level of the laser 30 is selected to provide a sufficient reference light beam signal to the digital cameras. For example, a light beam power level of 50 milli-Watts continuous-wave (CW) from the laser 30 is adequate. In the illustrated non-limiting embodiment, the laser 30 is a YAG CW laser. Further, in the illustrated embodiment, the lasers 30, 32 emit light beams having a wavelength of 1064 nano-meters, but other wavelengths in the visible and near-infrared band are also acceptable.

The collimating lens 34 is disposed within the housing 129 and is configured to receive the light beam from the laser 32 and to collimate the light beam. The collimated light beam 180 is directed from the collimating lens 34 towards the steering mirror 36.

The steering mirror 36 is disposed in the housing 129 and is configured to reflect the light beam 180 from the collimating lens 34 through an aperture 178 of the housing 129 towards the object 22. Portions of the light beam 180 are reflected from the object 22 toward the steering mirrors 42, 44, 46, 48, 50, 52, 54.

The steering mirrors 42, 44, 46, 48, 50, 52, 54 are provided to receive light beam portions reflected from the object 22 that pass through the aperture 179 of the housing 129. For example, the light beam portions 182, 184, 186, 188 correspond to portions of the light beam 180 reflected from the object 22. The steering mirrors 42, 44, 46, 48, 50, 52, 54 reflect the received light beam portions toward the afocal telescopes 62, 64, 66, 68, 70, 72, 74, respectively. In the illustrated embodiment, a first row of the steering mirrors including steering mirrors 42, 44, 46, 48 is disposed above and adjacent to a second row of mirrors including steering mirrors 50, 52, 54. In an alternative embodiment, more than seven steering mirrors can be utilized or less than seven steering mirrors can be utilized.

The afocal telescopes 62, 64, 66, 68, 70, 72, 74 are configured to collimate and condense received light beam portions reflected from the object 22 over time as the imaging system 20 moves between positions. For example, the afocal telescopes 62, 64, 66, 68, 70, 72, 74 are configured to collimate and condense received light beam portions reflected from the object 22 at first and second times, respectively when the imaging system 20 is at first and second positions, respectively. In the illustrated embodiment, a first row of afocal telescopes including afocal telescopes 62, 64, 66, 68 is disposed above and adjacent to a second row of afocal telescopes including afocal telescopes 70, 72, 74. In an alternative embodiment, more than seven afocal telescopes can be utilized or less than seven afocal telescopes can be utilized.

The afocal telescope 62 is provided to collimate and condense received light beam portions from the steering mirror 42 and to direct the light beam portions toward the beam splitter 82. As illustrated, the afocal telescope 62 includes lenses 130, 132 and a support structure (not shown) for holding the lenses 130, 132 thereon.

The afocal telescope 64 is provided to collimate and condense received light beam portions from the steering mirror 44 and to direct the light beam portions toward the beam splitter 84. As illustrated, the afocal telescope 64 includes lenses 134, 136 and a support structure (not shown) for holding the lenses 134, 136 thereon.

The afocal telescope 66 is provided to collimate and condense received light beam portions from the steering mirror 46 and to direct the light beam portions toward the beam splitter 86. As illustrated, the afocal telescope 66 includes lenses 138, 140 and a support structure (not shown) for holding the lenses 138, 140 thereon.

The afocal telescope 68 is provided to collimate and condense received light beam portions from the steering mirror 48 and to direct the light beam portions toward the beam splitter 88. As illustrated, the afocal telescope 68 includes lenses 142, 144 and a support structure (not shown) for holding the lenses 142, 144 thereon.

The afocal telescope 70 is provided to collimate and condense received light beam portions from the steering mirror 50 and to direct the light beam portions toward the beam splitter 90. As illustrated, the afocal telescope 70 includes lenses 160, 162 and a support structure (not shown) for holding the lenses 160, 162 thereon.

The afocal telescope 72 is provided to collimate and condense received light beam portions from the steering mirror 52 and to direct the light beam portions toward the beam splitter 92. As illustrated, the afocal telescope 72 includes lenses 164, 166 and a support structure (not shown) for holding the lenses 164, 166 thereon.

The afocal telescope 74 is provided to collimate and condense received light beam portions from the steering mirror 54 and to direct the light beam portions toward the beam splitter 94. As illustrated, the afocal telescope 74 includes lenses 168, 170 and a support structure (not shown) for holding the lenses 168, 170 thereon.

In an alternative embodiment, the pair of lenses in each of the afocal telescopes 62, 64, 66, 68, 70, 72, 74 are replaced by two or more mirrors.

The beam splitters 82, 84, 86, 88, 90, 92, 94 are configured to combine first, second, third, fourth, fifth, sixth, seventh light beam portions from the afocal telescope 62, 64, 66, 68, 70, 72, 74, respectively, with light beam portions 190, 191, 192, 193, 194, 195, 196, respectively, from the laser 30 to form interference patterns 200, 202, 204, 206, 208, 210, 212, respectively. In the illustrated embodiment, the beam splitters 82, 84, 86, 88 are aligned with one another such that a light beam from the laser 30 is transmitted through the fiber optical cable 120 and the collimating lens 124 such that the beam splitters 82, 84, 86, 88 receive light beam portions 190, 191, 192, 193, respectively. Also, the beam splitters 90, 92, 94 are aligned with one another such that a light beam from the laser 30 is transmitted through the fiber optical cable 122 and the collimating lens 126 such that the beam splitters 90, 92, 94 receive the light beam portions 194, 195, 196 respectively.

The digital cameras 102, 104, 106, 108, 110, 112, 114 are configured to receive the interference patterns 200, 202, 204, 206, 208, 210, 212, respectively, and to generate first, second, third, fourth, fifth, sixth, seventh raw image data, respectively, based on the interference patterns 200, 202, 204, 206, 208, 210, 212, respectively. The digital cameras transmit the plurality of raw image data to the computer 127 which processes the raw image data to obtain a synthetic image plane data for generating high-resolution images of the object 22 as will be explained in greater detail below.

The computer 127 is operably coupled to the digital cameras 102, 104, 106, 108, 110, 112, 114, the lasers 30, 32, the memory device 128, and the display device 135. The computer 127 is configured to process the received raw image data to obtain a synthetic image plane data associated with the object 22. Further, the computer 127 is configured to induce the display device 135 to display high-resolution images using the synthetic image plane data. The computer 127 is also configured to store data described herein in the memory device 128 and to access the data from the memory device 128.

Figure 5:
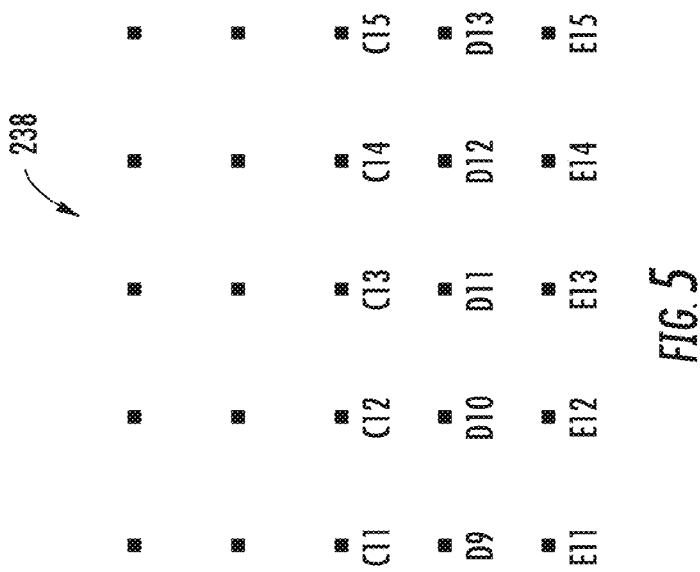
FIG. 5 shows a matrix storing a plurality of raw image data obtained from the afocal telescopes of FIG. 4.
Figure 4:
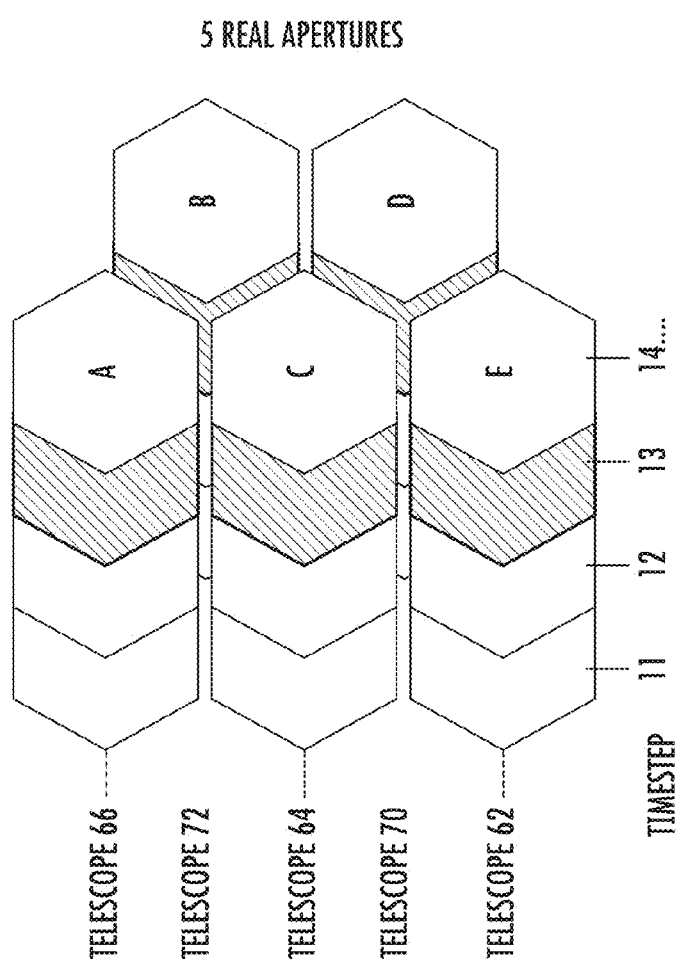
FIG. 4 shows movement of apertures of afocal telescopes over time utilized in the imaging system of FIG. 2.

Referring to FIGS. 4 and 5, before describing the method for generating synthetic image plane data associated with an object, a brief description of the movement of apertures of the array of afocal telescopes 62, 70, 64, 72, 66 and a matrix 238 storing a plurality of raw image data associated with the afocal telescopes 62, 70, 64, 72, 66 will be described. For purposes of simplicity, afocal telescopes 68, 74 are not shown in FIG. 4. In particular, FIG. 4 illustrates the movement of apertures of the afocal telescopes 62, 70, 64, 72, 66 over time. For example, telescope 62 has an aperture "E" that moves to different positions at timesteps 11, 12, 13, 14. Similarly, the telescope 70 has an aperture "D" that moves to different positions at timesteps 11, 12, 13, 14. During movement of the afocal telescopes 62, 70, 64, 72, 66, the plurality of raw image data from the afocal telescopes are captured every time the afocal telescopes move less than one-half of an aperture diameter of one of the afocal telescopes. FIG. 5 illustrates how the raw image data from the afocal telescopes is stored in the matrix 238 such that raw image data from a particular afocal telescope has approximately a 50% overlap with four adjacent raw image data. The entry "D11", for example, in the matrix 238 corresponds to the raw image data obtained from the afocal telescope 70 at the timestep 11.

Figure 6:
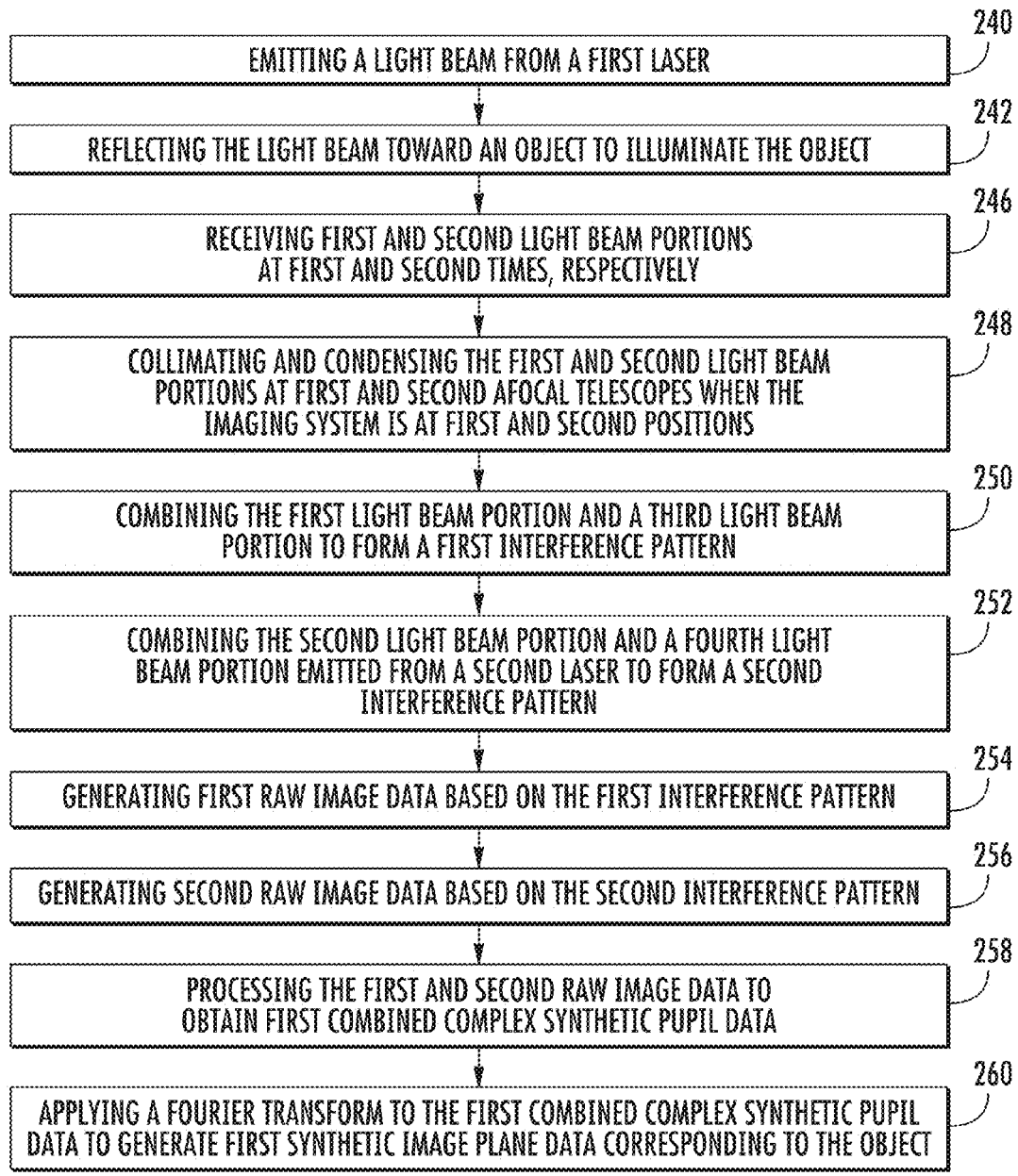
FIG. 6 shows a method for generating synthetic image plane data utilizing the imaging system of FIG. 2 in accordance with another aspect of the present invention.
Figure 7:
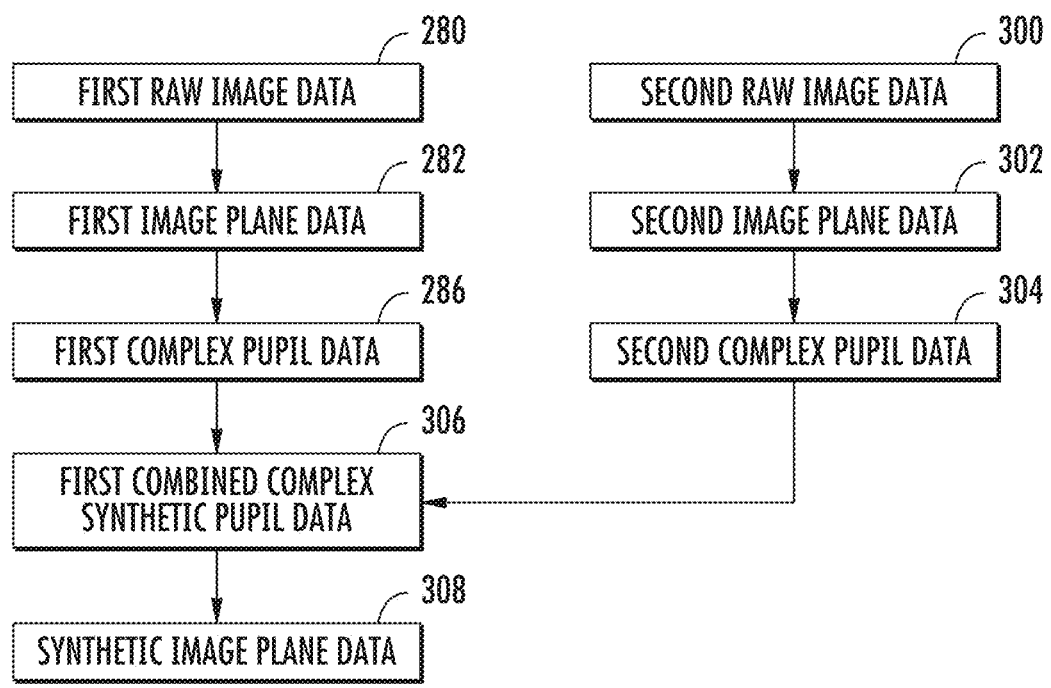
FIG. 7 is a block diagram showing image data generated by the method of FIG. 6.

Referring to FIGS. 6 and 7, a method for generating synthetic image plane data associated with the object 22 utilizing the imaging system 20 will now be explained. For purposes of simplicity, the following method will be explained utilizing two telescopes that have first and second raw image data that are processed and combined together to form synthetic image plane data.

At step 240, the laser 32 emits a light beam.

At step 242, the steering mirror 36 reflects the light beam toward the object 22 to illuminate the object 22.

At step 244, the steering mirrors 42, 50 receive first and second light beam portions, respectively, reflected from the object 22 and reflect the first and second light beam portions, respectively, toward afocal telescopes 62, 70 at first and second times, respectively.

At step 246, the afocal telescopes 62, 70 collimate and condense the first and second light beam portions at the first and second times, respectively, when the imaging system 20 is at first and second positions, respectively.

At step 248, the beam splitter 82 combines the first light beam portion from the afocal telescope 62 and a third light beam portion emitted from the laser 30 to form a first interference pattern.

At step 250, the beam splitter 90 combines the second light beam portion from the afocal telescope 70 and a fourth light beam portion emitted from the laser 30 to form a second interference pattern.

At step 252, the digital camera 102 receives the first interference pattern and generates first raw image data 280 based on the first interference pattern.

At step 254, the digital camera 110 receives the second interference pattern and generates second raw image data 300 based on the second interference pattern.

At step 258, the computer 127 processes the first and second raw image data 280, 300 to obtain first combined complex synthetic pupil data 306.

At step 260, the computer 127 applies a Fourier transform to the first combined complex synthetic pupil data 306 to generate first synthetic image plane data 308 corresponding to the object 22 and stores the first synthetic image plane data 308 in the memory device 128.

Figure 8:
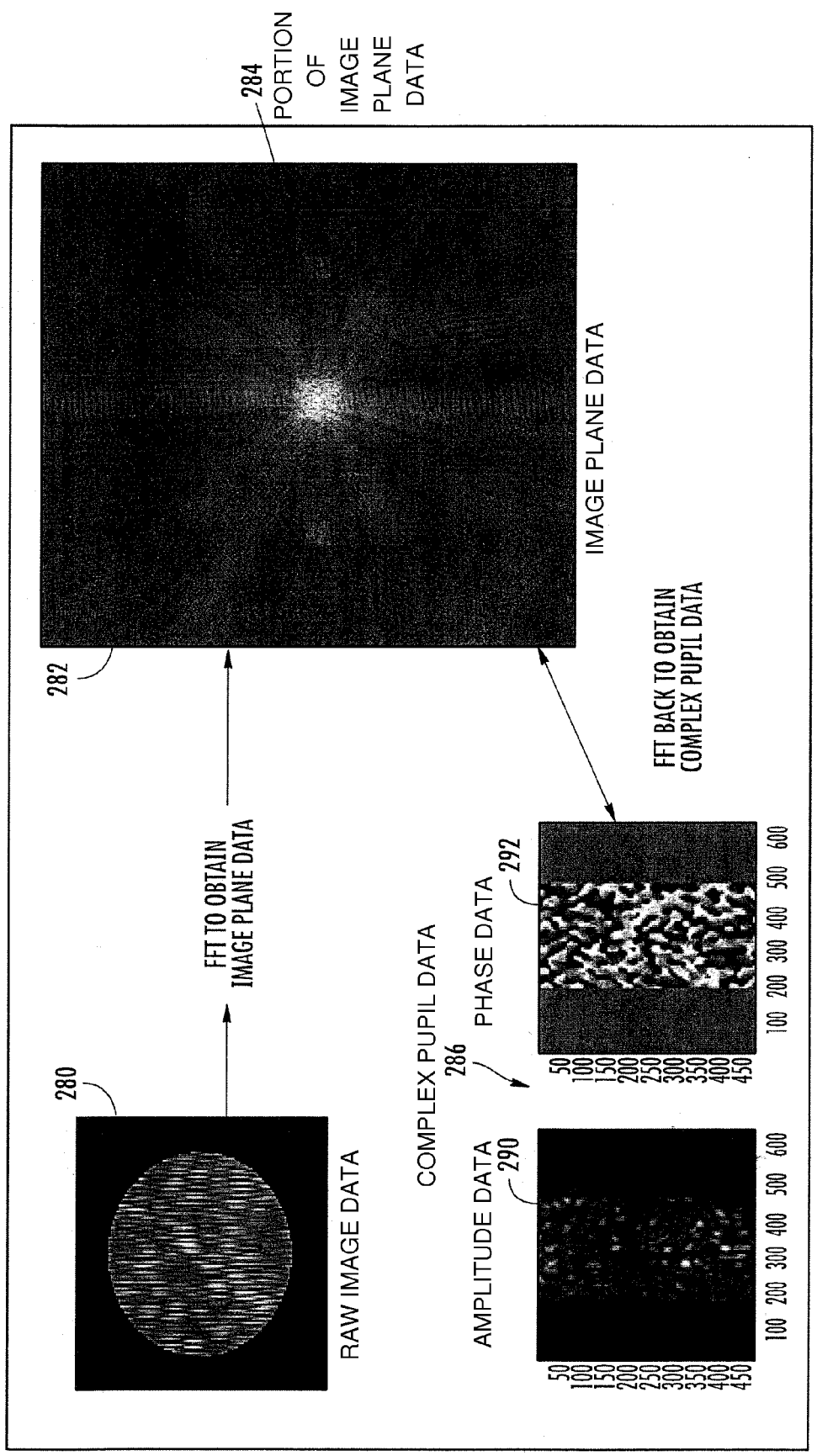
FIG. 8 is a schematic of a portion of the image data generated by the method of FIG. 6.
Figure 9:
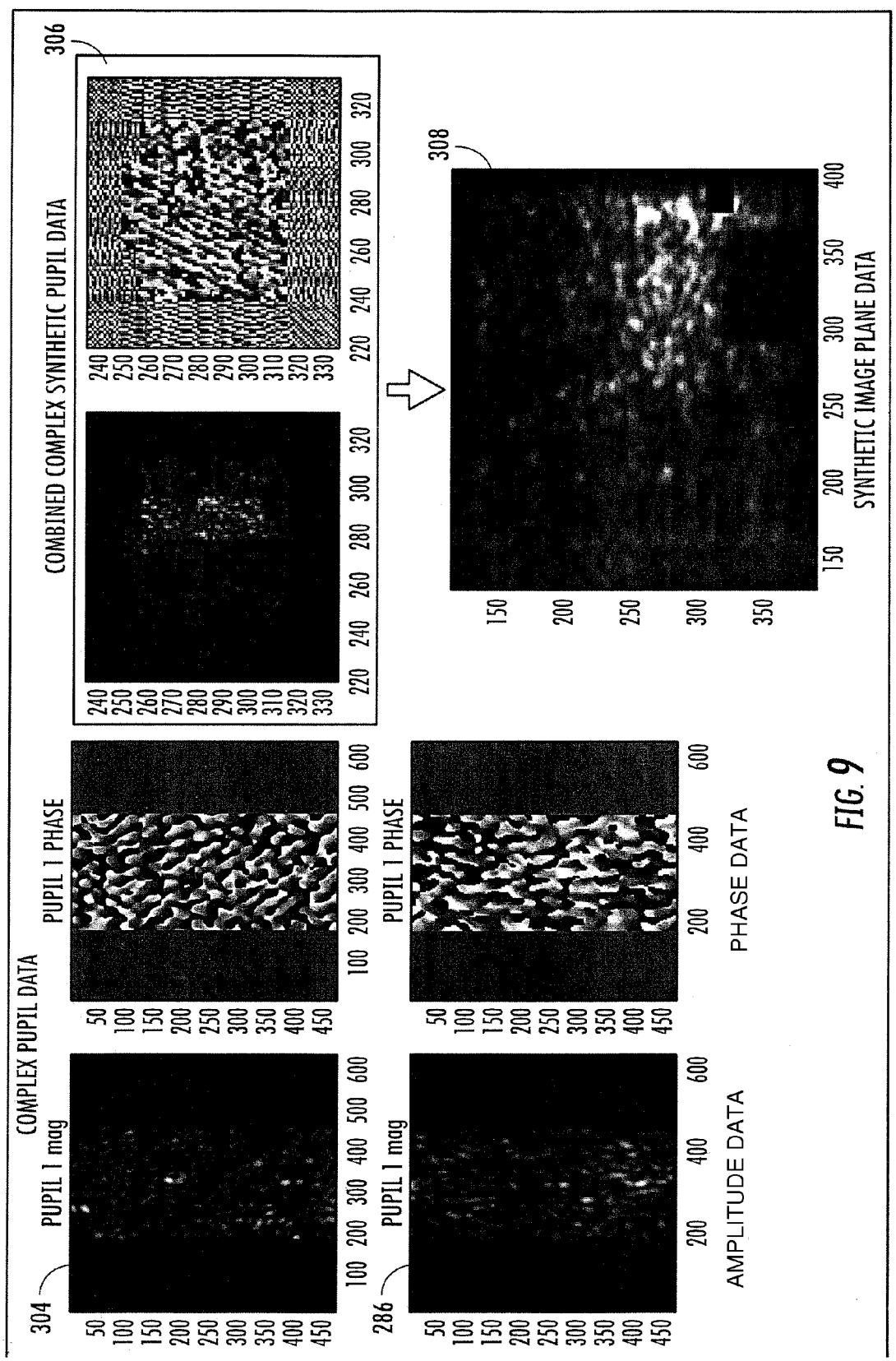
FIG. 9 is a schematic of a portion of the image data generated by the method of FIG. 6.

Referring to FIGS. 7-9, a more detailed explanation of the step 258 for generating the first combined complex synthetic pupil data will now be explained. It should be noted that the although the below methodology is explained utilizing first and second raw image data obtained from first and second distinct telescopes, the methodology could alternately be utilized with first and second raw image data obtained from a single telescope at first and second times, respectively, to generate combined complex synthetic pupil data.

First, the computer 127 applies a first Fourier transform to the first raw image data 280 to obtain first image plane data 282. The first image plane data 282 corresponds to a scalar electric field at a calculated image plane, but with terms that include: the object 22 (shown in FIG. 8 as element 284), the reference laser beam from the laser 30, and cross-terms of the object 22 and the reference laser beam.

Second, the computer 127 selects a portion 284 of the first image plane data 282 and centers the portion of the first image plane data 282 and applies a second Fourier transform to the portion of the first image plane data to obtain first complex pupil data 286. As illustrated, the first complex pupil data 286 has two parts: (i) complex pupil amplitude data 290, and (ii) complex pupil phase data 292. The complex pupil amplitude data 290 corresponds to a square root of an intensity of light coming from the object 22 as a function of x, y at the digital camera sensor plane. The complex pupil phase data 292 corresponds to a wavefront height z of light coming from the object 22 as a function of x, y at the digital camera sensor plane. Together, the complex pupil amplitude data 290 and the complex pupil phase data 292 describe a scalar electric field of light from the object 22 at the digital camera sensor plane.

Third, the computer 127 applies a third Fourier transform to the second raw image data 300 to obtain second image plane data 302.

Fourth, the computer 127 selects a portion of the second image plane data 302 and centers the portion of the second image plane data and applies a fourth Fourier transform to the portion of the second image plane data to obtain second complex pupil data 304.

Fifth, the computer 127 determines an X-axis offset value, a Y-axis offset value, and a yaw rotation offset value between the first and second complex pupil data 286, 304.

Sixth, the computer 127 applies a fifth Fourier transform to the first complex pupil data 286 to obtain the portion 284 of the first image plane data 286.

Seventh, the computer 127 applies a sixth Fourier transform to the second complex pupil data 304 to obtain the portion of the second image plane data 302.

Eighth, the computer 127 determines a pitch angle offset value and a roll angle offset value between the portion 284 of the first image plane data 282 and the portion of the second image plane data 302.

Ninth, the computer 127 determines a Z-axis offset value between the portion 284 of the first image plane data 282 and the portion of the second image plane data 302.

Tenth, the computer 127 determines a correlation value associated with the first and second complex pupil data 286, 304 utilizing the X-axis offset value, the Y-axis offset value, the Z-axis offset value, the yaw rotation offset value, the pitch angle offset value, and the roll angle offset value.

Eleventh, the computer 127 makes a determination as to whether the correlation value is greater than a threshold value. If so, the computer 127 determines the first combined complex synthetic pupil data 308 utilizing the first and second complex pupil data 286, 304, the X-axis offset value, the Y-axis offset value, the Z-axis offset value, the yaw rotation offset value, the pitch angle offset value, and the roll angle offset value.

Figure 10:
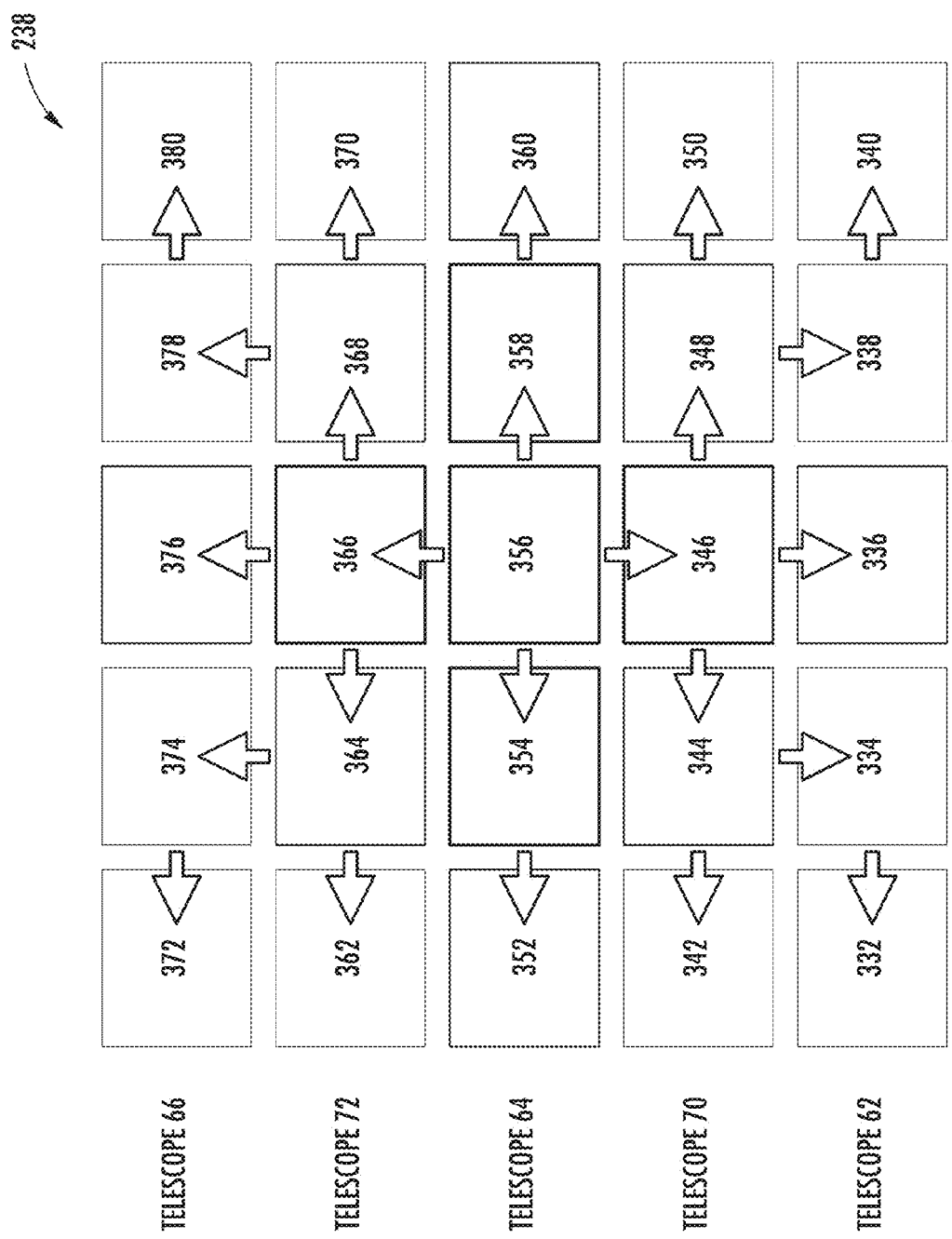
FIG. 10 is a schematic of a matrix storing a plurality of raw image data utilized by the system of FIG. 2.

Referring to FIG. 10, another schematic of matrix 238 that stores a plurality of raw image data obtained from the afocal telescopes utilized by the imaging system 20 is illustrated. For example, the matrix 238 has raw image data 332, 334, 336, 338, 340 associated with the telescope 62. Further, the matrix 238 has raw image data 342, 344, 346, 348, 350 associated with the telescope 70. Further, the matrix 238 has raw image data 352, 354, 356, 358, 360 associated with the telescope 64. Further, the matrix 238 has raw image data 362, 364, 366, 368, 370 associated with the telescope 72. Further, the matrix 238 has raw image data 372, 374, 376, 378, 380 associated with the telescope 66.

A recursive algorithm is utilized to access each raw image data and to generate complex pupil data based on each raw image data. Further, the recursive algorithm combines the complex pupil data with each other to form a combined synthetic pupil data. In the illustrated embodiment, the recursive algorithm starts with the raw image data 356 and attempts to combine its corresponding complex pupil data with complex pupil data obtained from four adjacent raw image data components 346, 354, 358 and 366. The recursive algorithm continues to process each of the raw image data components until all of the raw image data components are linked together. A more detailed explanation of aspects of the recursive algorithm will be provided hereinafter.

Figure 11:
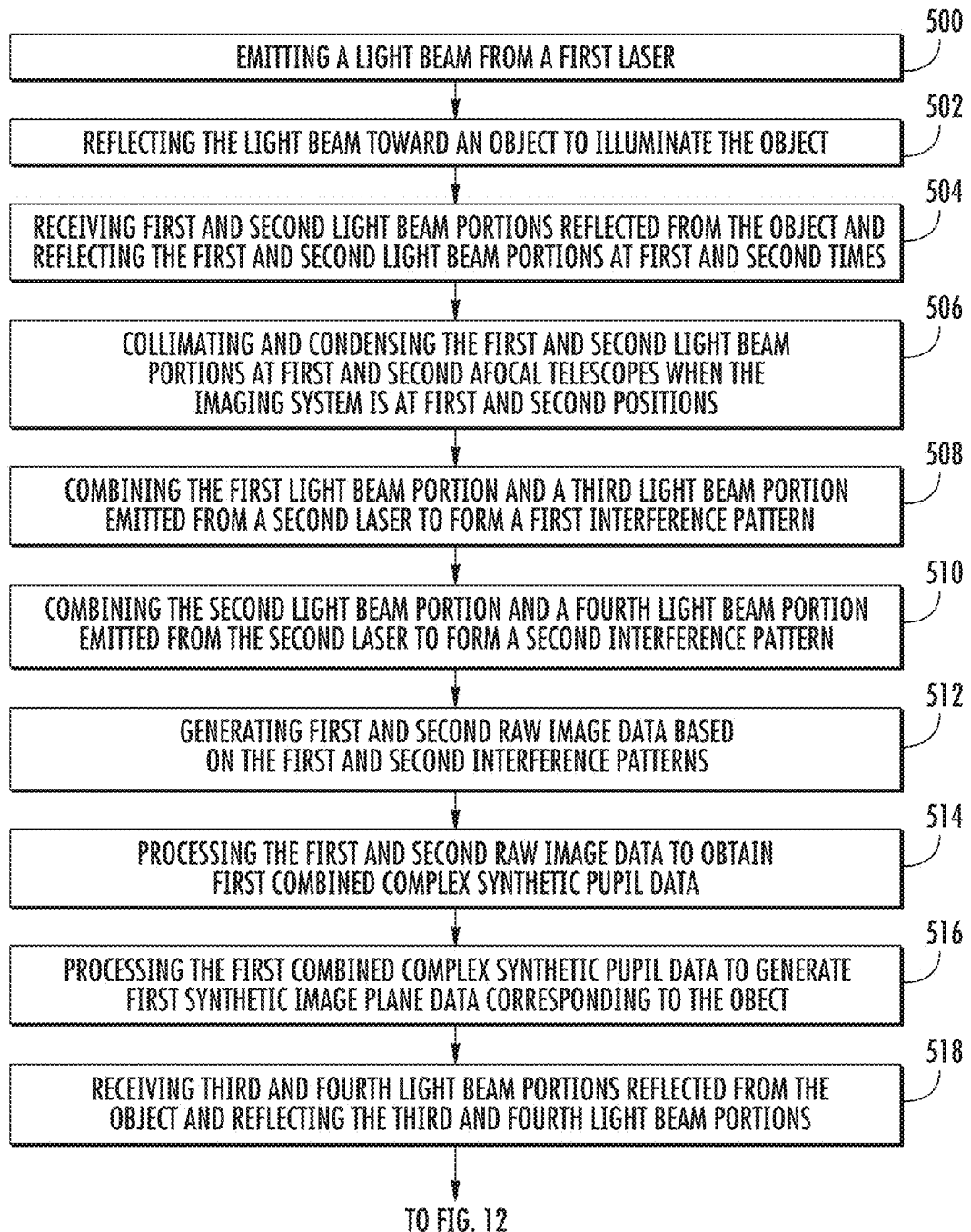
FIGS. 11 and 12 show a method for generating synthetic image plane data in accordance with another aspect of the present invention.
Figure 12:
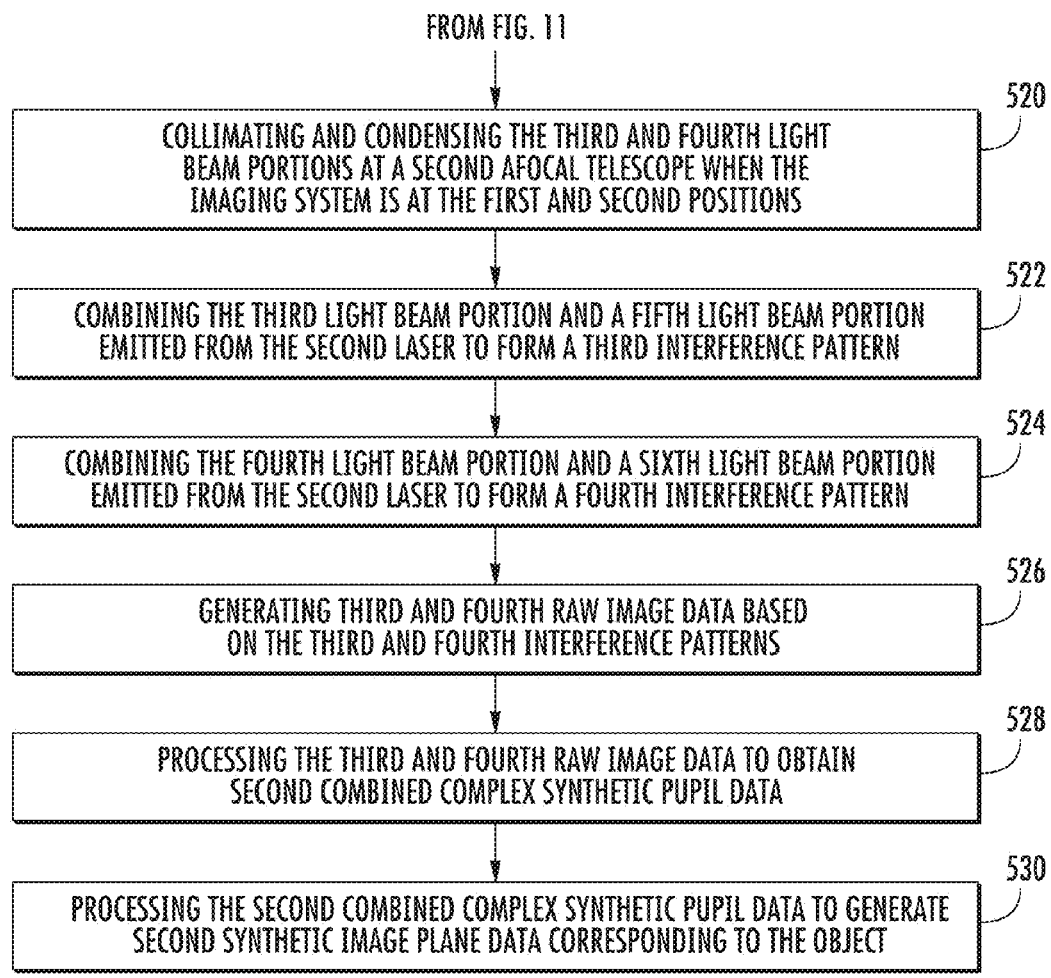

Referring to FIGS. 11 and 12, another method for generating synthetic image plane data associated with the object 22 utilizing the imaging system 20 will now be explained. For purposes of simplicity, the following method will be explained utilizing a first telescope that has associated first and second raw image data that are processed and combined together to form a first combined synthetic image plane data, and a second telescope that has associated third and fourth raw image data that are processed and combined together to form a second combined synthetic image plane data.

At step 500, the laser 32 emits a light beam.

At step 502, the steering mirror 36 reflects the light beam toward the object 22 to illuminate the object 22.

At step 504, the steering mirror 42 receives first and second light beam portions reflected from the object and reflects the first and second light beam portions toward the afocal telescope 62 at first and second times, respectively.

At step 506, the afocal telescope 62 collimates and condenses the first and second light beam portions at the first and second times, respectively, when the imaging system 20 is at first and second positions, respectively.

At step 508, the beam splitter 82 combines the first light beam portion from the afocal telescope 62 and a third light beam portion emitted from the laser 30 to form a first interference pattern.

At step 510, the beam splitter 82 combines the second light beam portion from the afocal telescope 62 and a fourth light beam portion emitted from the laser 30 to form a second interference pattern. The lasers 30, 30 emit light beams at a same wavelength.

At step 512, the digital camera 102 receives the first and second interference patterns and generates first and second raw image data, respectively, based on the first and second interference patterns, respectively.

At step 514, the computer 127 processes the first and second raw image data to obtain first combined complex synthetic pupil data.

At step 516, the computer 127 processes the first combined complex synthetic pupil data to generate first synthetic image plane data corresponding to the object 22 and stores the first synthetic image plane data in the memory device 128.

At step 518, the steering mirror 50 receives third and fourth light beam portions reflected from the object 22 and reflects the third and fourth light beam portions toward the afocal telescope 70 at the first and second times, respectively.

At step 520, the afocal telescope 70 collimates and condenses the third and fourth light beam portions at the first and second times, respectively, when the imaging system 20 is at the first and second positions, respectively.

At step 522, the beam splitter 90 combines the third light beam portion from the afocal telescope 70 and a fifth light beam portion emitted from the laser 30 to form a third interference pattern.

At step 524, the beam splitter 90 combines the fourth light beam portion from the afocal telescope 70 and a sixth light beam portion emitted from the laser 30 to form a fourth interference pattern.

At step 526, the digital camera 110 receives the third and fourth interference patterns and generates third and fourth raw image data, respectively, based on the third and fourth interference patterns, respectively.

At step 528, the computer 127 processes the third and fourth raw image data to obtain second combined complex synthetic pupil data.

At step 530, the computer 127 processes the second combined complex synthetic pupil data to generate second synthetic image plane data corresponding to the object 22 and stores the second synthetic image plane data in the memory device 128.

Figure 13:
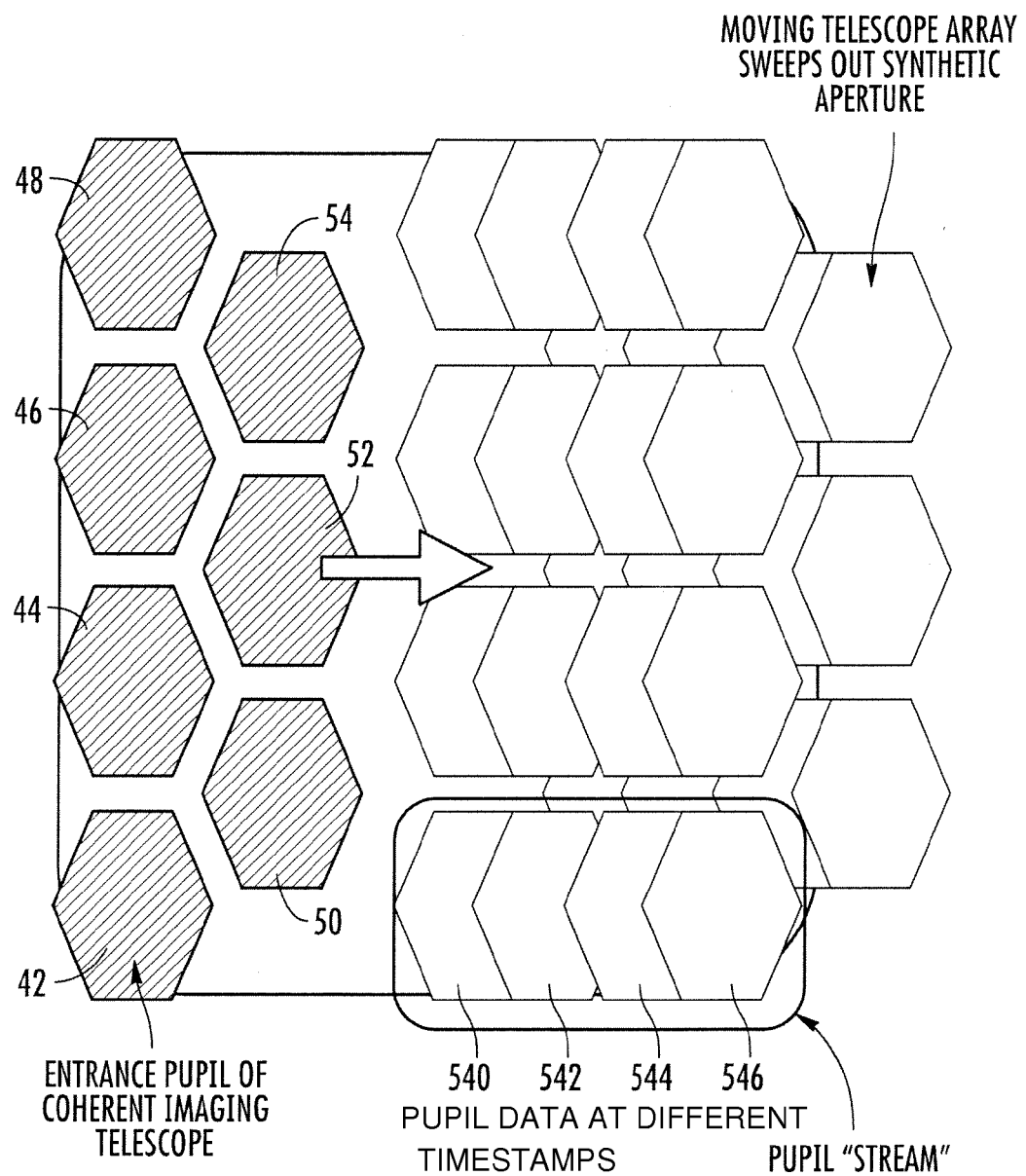
FIG. 13 is a simplified schematic showing a plurality of raw image data being generated by a plurality of afocal telescopes over time.

Referring to FIG. 13, an explanation of an alternative methodology for combining raw image data obtained from multiple afocal telescopes will be explained. As shown, an array of telescopes 42, 44, 46, 48, 50, 52, 54 moves over time and sweeps out a synthetic aperture. Raw image data from each telescope is combined together to form synthetic pupil streams. Further, pupil streams from different telescopes are then combined together to form synthetic image plane data corresponding to a composite image of the object being viewed.

Figure 14:
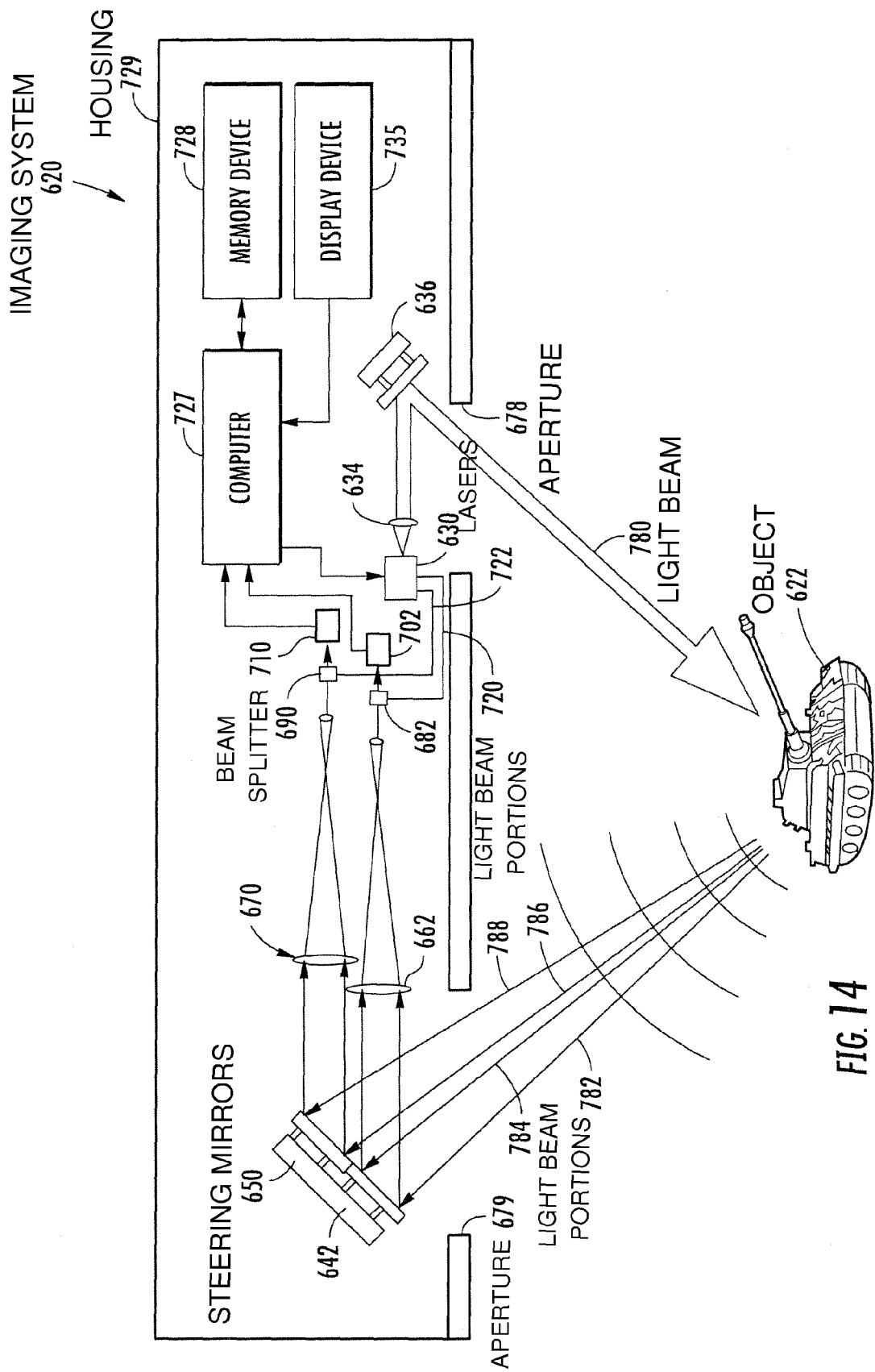
FIG. 14 is a side view of another imaging system in accordance with another aspect of the present invention.
Figure 15:
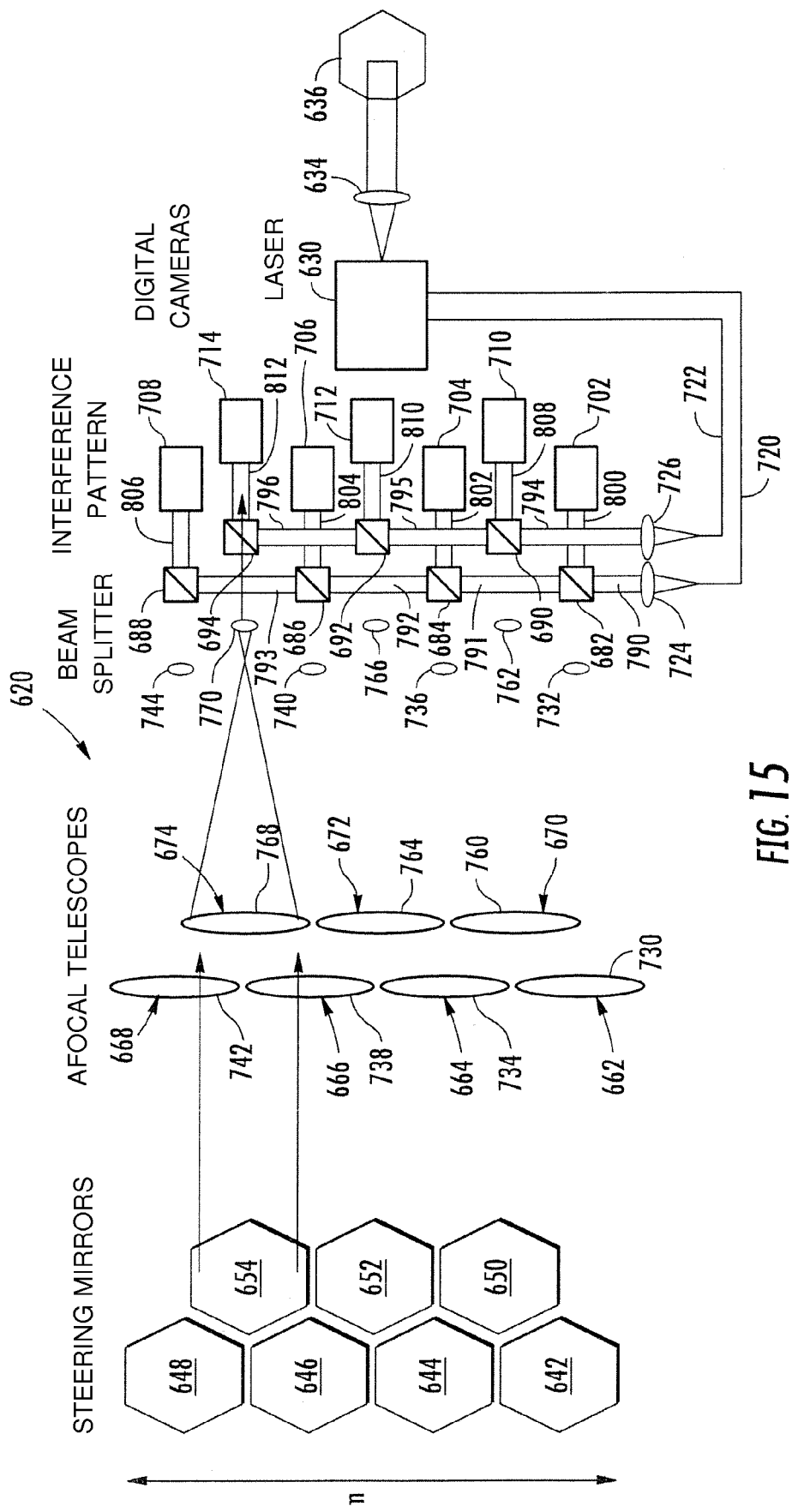
FIG. 15 is an enlarged top view of the imaging system of FIG. 14.

Referring now to FIGS. 14 and 15, another imaging system 620 for generating image data associated with an object 622 in accordance with the invention is illustrated. The imaging system 620 includes a laser 630, collimating lens 634, a steering mirrors 636, 642, 644, 646, 648, 650, 652, 654, afocal telescopes 662, 664, 666, 668, 670, 672, 674, beam splitters 682, 684, 686, 688, 690, 692, 694, digital cameras 702, 704, 706, 708, 710, 712, 714, fiber optical cables 720, 722, collimating lens 724, 726, a computer 727, a memory device 728, a display device 735, and a housing 729.

The laser 630 is disposed within the housing 129 and is configured to emit a light beam to illuminate the object 622 in response to a control signal from the computer 127. A portion of the light beam is directed by the fiber optical cables 724, 726 to the beam splitters for generating interference patterns. The power level of the laser 630 is selected to provide a sufficient return light beam signal to the digital cameras. For example, a light beam power level of 50 milli-Watts continuous-wave (CW) from the laser 630 is adequate. In the illustrated embodiment, the laser 630 is a YAG CW laser. Further, in the illustrated embodiment, the laser 630 emits light beams having a wavelength of 1064 nano-meters, but other wavelengths in the visible and near-infrared band are also acceptable.

The collimating lens 634 is disposed within the housing 729 and is configured to receive the light beam from the laser 630 and to collimate the light beam. The collimated light beam 780 is directed from the collimating lens 634 towards the steering mirror 636.

The steering mirror 636 is disposed in the housing 729 and is configured to reflect the light beam 780 from the collimating lens 634 through an aperture 678 of the housing 729 towards the object 622. Portions of the light beam 780 are reflected from the object 622 toward the steering mirrors 642, 644, 646, 648, 650, 652, 654.

The steering mirrors 642, 644, 646, 648, 650, 652, 654 are provided to receive light beam portions reflected from the object 622 that pass through the aperture 679 of the housing 729. For example, the light beam portions 782, 784, 786, 788 correspond to portions of the light beam 780 reflected from the object 622. The steering mirrors 642, 644, 646, 648, 650, 652, 654 reflect the received light beam portions toward the afocal telescopes 662, 664, 666, 668, 670, 672, 674, respectively. In the illustrated embodiment, a first row of the steering mirrors including steering mirrors 642, 644, 646, 648 is disposed above and adjacent to a second row of mirrors including steering mirrors 650, 652, 654. In an alternative embodiment, more than seven steering mirrors can be utilized or less than seven steering mirrors can be utilized.

The afocal telescopes 662, 664, 666, 668, 670, 672, 674 are configured to collimate and condense received light beam portions reflected from the object 622 over time as the imaging system 620 moves between positions. For example, the afocal telescopes 662, 664, 666, 668, 670, 672, 674 are configured to collimate and condense received light beam portions reflected from the object 22 at first and second times, respectively when the imaging system 620 is at first and second positions, respectively, and to direct the light beam portions toward the beam splitters 682, 684, 686, 688, 690, 692, 694, respectively. In the illustrated embodiment, a first row of afocal telescopes including afocal telescopes 662, 664, 666, 668 is disposed above and adjacent to a second row of afocal telescopes including afocal telescopes 670, 672, 674. In an alternative embodiment, more than seven afocal telescopes can be utilized or less than seven afocal telescopes can be utilized.

The afocal telescope 662 is provided to collimate and condense received light beam portions from the steering mirror 642 and to direct the light beam portions toward the beam splitter 682. As illustrated, the afocal telescope 662 includes lenses 730, 732 and a support structure (not shown) for holding the lenses 730, 732 thereon.

The afocal telescope 664 is provided to collimate and condense received light beam portions from the steering mirror 644 and to direct the light beam portions toward the beam splitter 684. As illustrated, the afocal telescope 664 includes lenses 734, 736 and a support structure (not shown) for holding the lenses 734, 736 thereon.

The afocal telescope 666 is provided to collimate and condense received light beam portions from the steering mirror 646 and to direct the light beam portions toward the beam splitter 686. As illustrated, the afocal telescope 666 includes lenses 738, 740 and a support structure (not shown) for holding the lenses 738, 740 thereon.

The afocal telescope 668 is provided to collimate and condense received light beam portions from the steering mirror 648 and to direct the light beam portions toward the beam splitter 688. As illustrated, the afocal telescope 668 includes lenses 742, 744 and a support structure (not shown) for holding the lenses 742, 744 thereon.

The afocal telescope 670 is provided to collimate and condense received light beam portions from the steering mirror 650 and to direct the light beam portions toward the beam splitter 690. As illustrated, the afocal telescope 670 includes lenses 760, 762 and a support structure (not shown) for holding the lenses 760, 762 thereon.

The afocal telescope 672 is provided to collimate and condense received light beam portions from the steering mirror 652 and to direct the light beam portions toward the beam splitter 692. As illustrated, the afocal telescope 672 includes lenses 764, 766 and a support structure (not shown) for holding the lenses 764, 766 thereon.

The afocal telescope 674 is provided to collimate and condense received light beam portions from the steering mirror 654 and to direct the light beam portions toward the beam splitter 694. As illustrated, the afocal telescope 674 includes lenses 768, 770 and a support structure (not shown) for holding the lenses 768, 770 thereon.

In an alternative embodiment, the pair of lenses in each of the afocal telescopes 662, 664, 666, 668, 670, 672, 674 are replaced by two or more mirrors.

The beam splitters 682, 684, 686, 688, 690, 692, 694 are configured to combine first, second, third, fourth, fifth, sixth, seventh light beam portions from the afocal telescope 662, 664, 666, 668, 670, 672, 674, respectively, with light beam portions 790, 791, 792, 793, 794, 795, 796, respectively, from the laser 630 to form interference patterns 800, 802, 804, 806, 808, 810, 812, respectively. In the illustrated embodiment, the beam splitters 682, 684, 686, 688 are aligned with one another such that a light beam from the laser 630 is transmitted through the fiber optical cable 720 and the collimating lens 724 such that the beam splitters 682, 684, 686, 688 receive the light beam portions 790, 791, 792, 793, respectively. Also, the beam splitters 690, 692, 694 are aligned with one another such that a light beam from the laser 630 is transmitted through the fiber optical cable 722 and the collimating lens 726 such that the beam splitters 690, 692, 694 receive the light beam portions 796, 795, 796 respectively.

The digital cameras 702, 704, 706, 708, 710, 712, 714 are configured to receive the interference patterns 800, 802, 804, 806, 808, 810, 812, respectively, and to generate first, second, third, fourth, fifth, sixth, seventh raw image data, respectively, based on the interference patterns 800, 802, 804, 806, 808, 810, 812, respectively. The digital cameras transmit a plurality of raw image data to the computer 727 which processes the raw image data to obtain a synthetic image plane data associated with the object 622.

The computer 727 is operably coupled to the digital cameras 702, 704, 706, 708, 710, 712, 714, the laser 630, the memory device 728, and the display device 735. The computer 727 is configured to process the received raw image data to obtain a synthetic image plane data associated with the object 622 as will be explained in greater detail below. Further, the computer 127 is configured to induce the display device 735 to display high-resolution images using the synthetic image plane data. The computer 727 is also configured to store data described herein in the memory device 728 and to access the data from the memory device 728.

Figure 16:
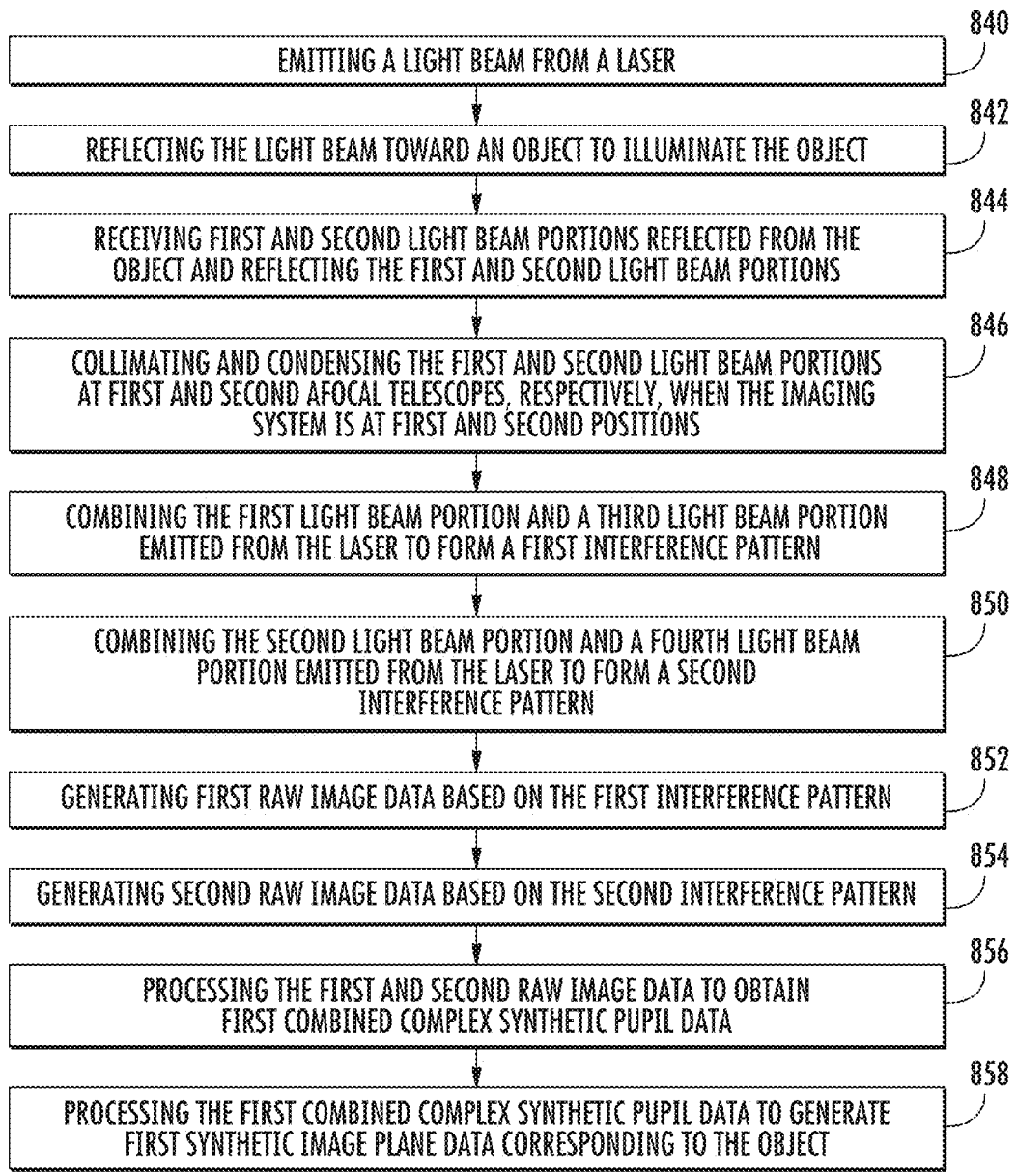
FIGS. 16-18 show a method for generating synthetic image plane data utilizing the system of FIG. 14 in accordance with another aspect of the present invention.

Referring to FIG. 16, another method for generating synthetic image plane data associated with the object 622 utilizing the imaging system 620 will now be explained. For purposes of simplicity, the following method will be explained utilizing a single laser and two telescopes phased with each other.

At step 840, the laser 630 emits a light beam.

At step 842, the steering mirror 636 reflects the light beam toward the object 622 to illuminate the object 622.

At step 844, the steering mirrors 642, 650 receive first and second light beam portions, respectively, reflected from the object 622 and reflect the first and second light beam portions, respectively, toward afocal telescopes 662, 670 at first and second times, respectively.

At step 846, the afocal telescopes 662, 670 collimate and condense the first and second light beam portions, respectively, at the first and second times, respectively, when the imaging system 620 is at first and second positions, respectively.

At step 848, the beam splitter 682 combines the first light beam portion from the afocal telescope 662 and a third light beam portion emitted from the laser 630 to form a first interference pattern.

At step 850, the beam splitter 690 combines the second light beam portion from the afocal telescope 670 and a fourth light beam portion emitted from the laser 630 to form a second interference pattern.

At step 852, the digital camera 702 receives the first interference pattern and generates first raw image data based on the first interference pattern.

At step 854, the digital camera 710 receives the second interference pattern and generates second raw image data based on the second interference pattern.

At step 856, the computer 727 processes the first and second raw image data to obtain first combined complex synthetic pupil data.

At step 858, the computer 727 processes the first combined complex synthetic pupil data to generate first synthetic image plane data corresponding to the object 622 and stores the first synthetic image plane data in the memory device 728.

Figure 17:
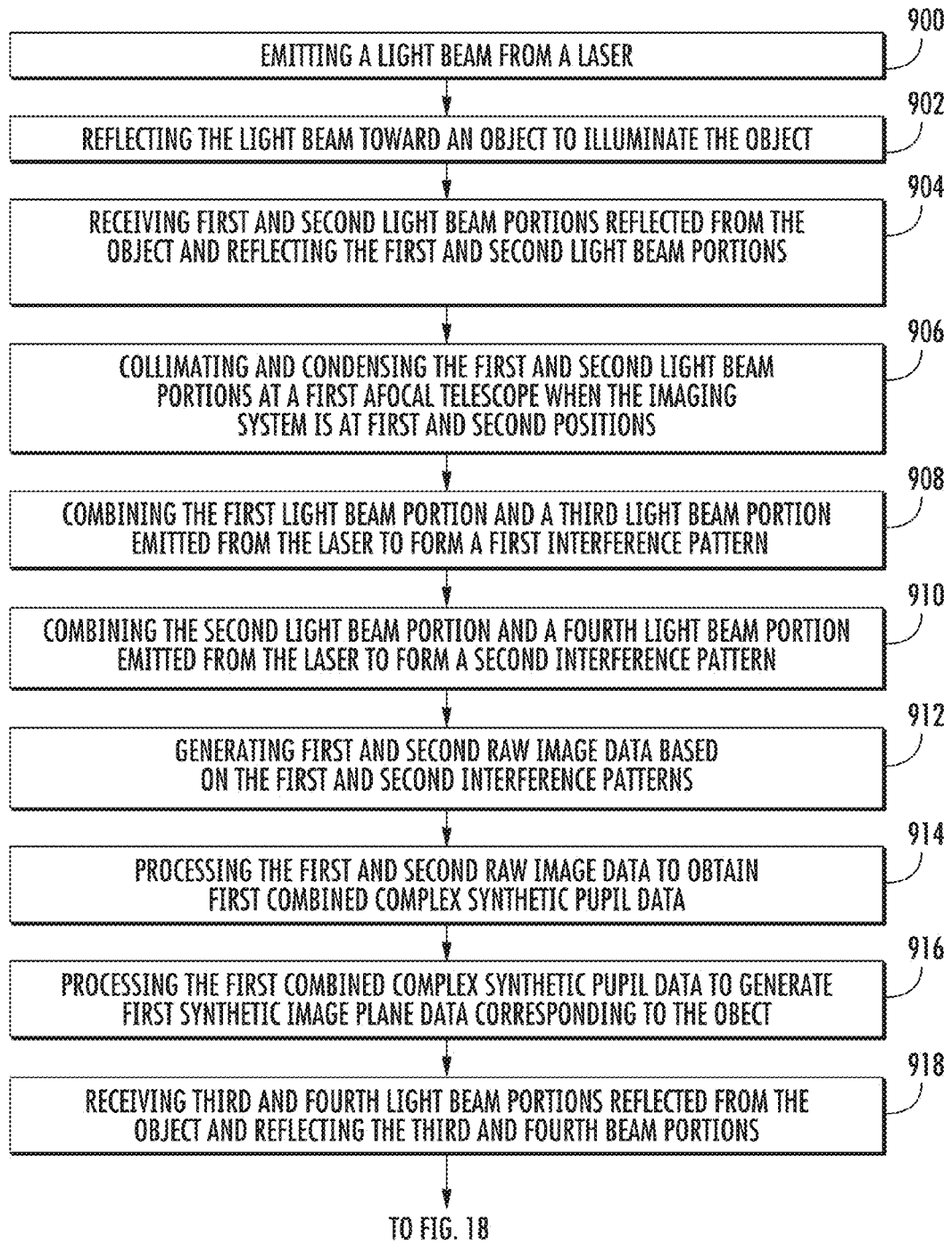
Figure 18:
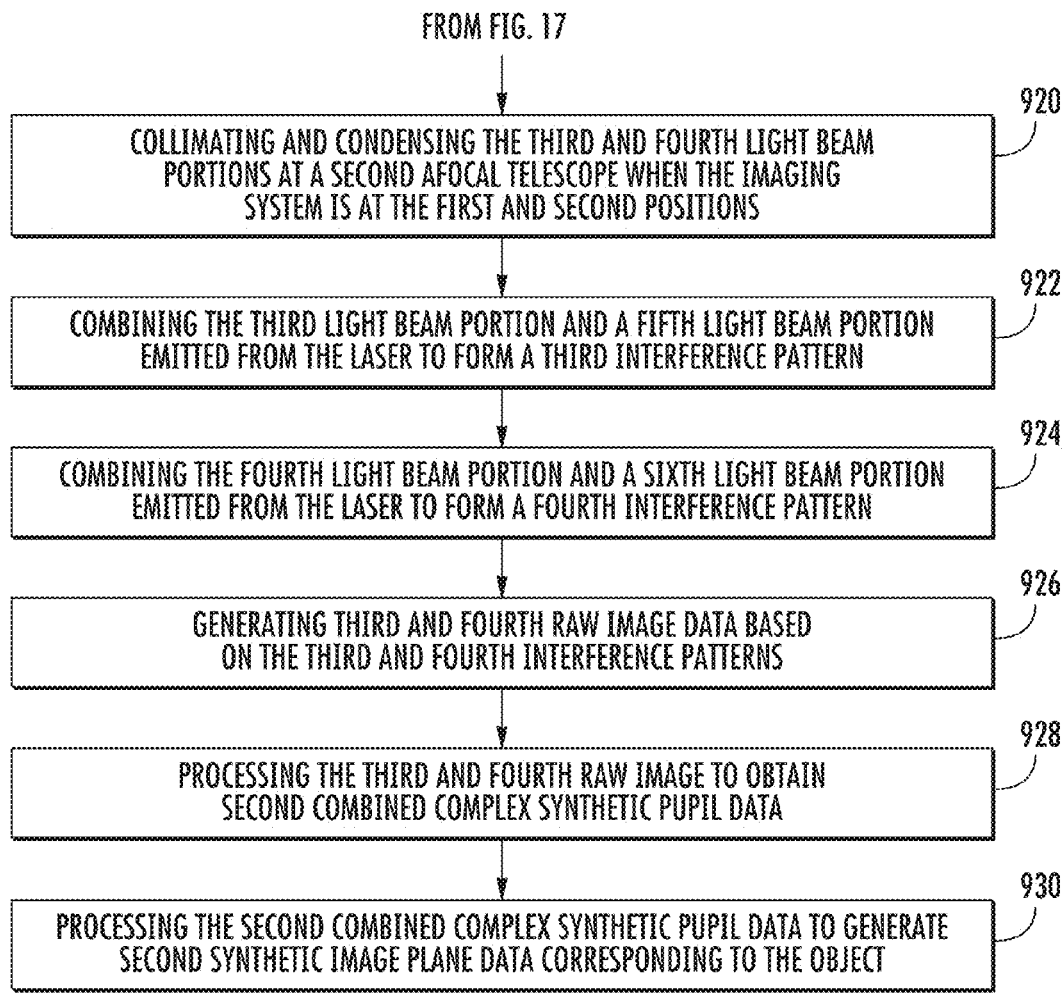

Referring to FIGS. 17 and 18, another method for generating synthetic image plane data associated with the object 622 utilizing the imaging system 620 will now be explained.

For purposes of simplicity, the following method will be explained utilizing a single laser and a first telescope phased with itself and a second telescope phased with itself.

At step 900, the laser 630 emits a light beam.

At step 902, the steering mirror 636 reflects the light beam toward the object 622 to illuminate the object 622.

At step 904, the steering mirror 642 receives first and second light beam portions reflected from the object 622 and reflects the first and second light beam portions toward the afocal telescope 662 at first and second times, respectively.

At step 906, the afocal telescope 662 collimates and condenses the first and second light beam portions at first and second times, respectively, when the imaging system 620 is at first and second positions, respectively.

At step 908, the beam splitter 682 combines the first light beam portion from the afocal telescope 662 and a third light beam portion emitted from the laser 630 to form a first interference pattern.

At step 910, the beam splitter 682 combines the second light beam portion from the afocal telescope 662 and a fourth light beam portion emitted from the laser 630 to form a second interference pattern.

At step 912, the digital camera 702 receives the first and second interference patterns and generates first and second raw image data, respectively, based on the first and second interference patterns, respectively.

At step 914, the computer 727 processes the first and second raw image data to obtain first combined complex synthetic pupil data.

At step 916, the computer 727 processes the first combined complex synthetic pupil data to generate first synthetic image plane data corresponding to the object 622 and stores the first synthetic image plane data in the memory device 728.

At step 918, the steering mirror 650 receives third and fourth light beam portions reflected from the object 622 and reflects the third and fourth light beam portions toward the afocal telescope 670 at the first and second times, respectively.

At step 920, the afocal telescope 670 collimates and condenses the third and fourth light beam portions at the first and second times, respectively, when the imaging system 620 is at the first and second positions, respectively.

At step 922, the beam splitter 690 combines the third light beam portion from the afocal telescope 670 and a fifth light beam portion emitted from the laser 630 to form a third interference pattern.

At step 924, the beam splitter 690 combines the fourth light beam portion from the afocal telescope 670 and a sixth light beam portion emitted from the laser 630 to form a fourth interference pattern.

At step 926, the digital camera 710 receives the third and fourth interference patterns and generates third and fourth raw image data, respectively, based on the third and fourth interference patterns, respectively.

At step 928, the computer 727 processes the third and fourth raw image data to obtain second combined complex synthetic pupil data.

At step 930, the computer 727 processes the second combined complex synthetic pupil data to generate second synthetic image plane data corresponding to the object 622 and stores the second synthetic image plane data in the memory device 728. In particular, the computer 727 applies a Fourier transform to the second combined complex synthetic pupil data to generate the second synthetic image plane data.

Figure 19:
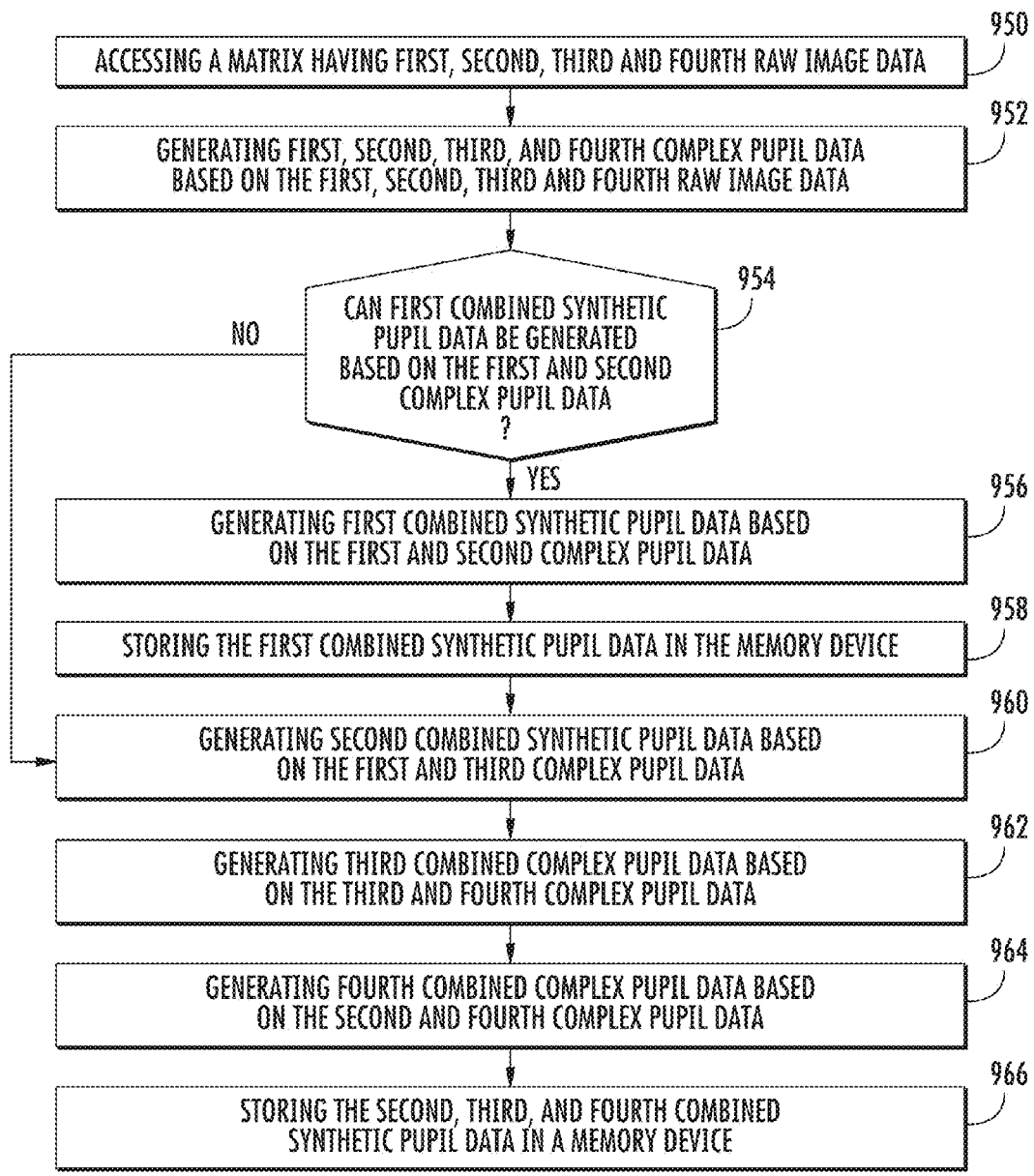
FIG. 19 shows a method for combining image data in accordance with another aspect of the present invention.

Referring to FIGS. 2, 10 and 19, an alternative method utilized by the recursive algorithm for combining raw image data in the matrix 238 will now be explained. For purposes of simplicity, when discussing the matrix 238, it will be assumed that only four raw image data components are stored in the matrix 238. Further, the subject method will be discussed utilizing the imaging system 20.

At step 950, the memory device 128 stores the matrix 238 with raw image data 356, 358, 366, 368 stored therein. The first row of the matrix 238 has the raw image data 356, 358 therein. The second row of the matrix 238 has the raw image data 366, 368 therein. A first column of the matrix 238 having the raw image data 356, 366 therein. At least of a portion of the raw image data 356, 358 overlap each other, and at least a portion of the raw image data 366, 368 overlap each other. At least a portion of the raw image data 356, 366 overlap each other, and at least a portion of the raw image data 358, 368 overlap each other.

At step 950, the computer 127 generates first, second, third, and fourth complex pupil data based on the raw image data 356, 358, 366, 368, respectively.

At step 954, the computer 127 makes a determination as to whether the first combined synthetic pupil data can be generated based on the first and second complex pupil data. If the value of step 954 equals "yes", the method advances to step 956. Otherwise, the method advances to step 960.

At step 956, the computer 127 generates first combined synthetic pupil data based on the first and second complex pupil data. After step 956, the method advances to step 958.

At step 958, the computer 127 stores the first synthetic pupil data in the memory device 128. After step 958, the method advances to step 960.

Referring again to step 954, if the value of step 954 equals "no", the method advances to step 960. At step 960, the computer 127 generates second combined synthetic pupil data based on the first and third complex pupil data.

At step 962, the computer 127 generates third combined complex pupil data based on the third and fourth complex pupil data.

At step 964, the computer 127 generates fourth combined complex pupil data based on the second and fourth complex pupil data.

At step 966, the computer 127 stores the second, third, and fourth combined synthetic pupil data in the memory device 128.

Figure 20:
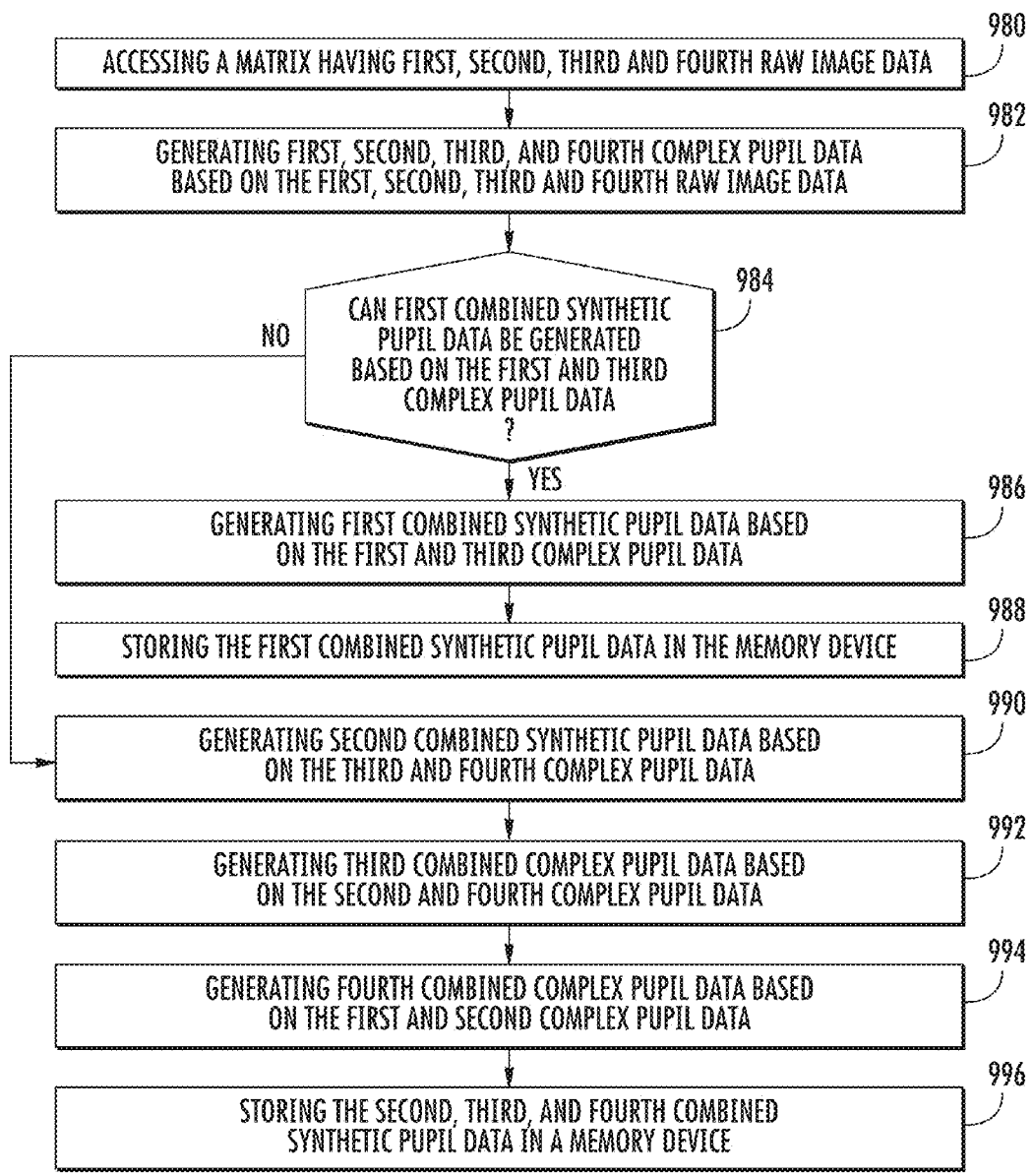
FIG. 20 shows another method for combining image data in accordance with yet another aspect of the present invention.

Referring to FIGS. 2, 10 and 20, yet another alternative method utilized by the recursive algorithm for combining raw image data will now be explained. For purposes of simplicity, when discussing the matrix 238, it will be assumed that only four raw image data components are stored in the matrix 238. Further, the following submethod will be discussed utilizing the imaging system 20.

At step 980, the memory device 128 stores the matrix 238 with raw image data 356, 358, 366, 368 stored therein. The first row of the matrix 238 has the raw image data 356, 358 therein. The second row of the matrix 238 has the raw image data 366, 368 therein. A first column of the matrix 238 having the raw image data 356, 366 therein. At least of a portion of the raw image data 356, 358 overlap each other, and at least a portion of the raw image data 366, 368 overlap each other. At least a portion of the raw image data 356, 366 overlap each other, and at least a portion of the raw image data 358, 368 overlap each other.

At step 982, the computer 127 generates first, second, third, and fourth complex pupil data based on the raw image data 356, 358, 366, 368, respectively.

At step 984, the computer 127 makes a determination as to whether the first combined synthetic pupil data can be generated based on the first and third complex pupil data. If the value of step 984 equals "yes", the method advances to step 986. Otherwise, the method advances to step 990.

At step 986, the computer 127 generates first combined synthetic pupil data based on the first and third complex pupil data. After step 986, the method advances to step 988. After step 986, the method advances to step 988.

At step 988, the computer 127 stores the first combined synthetic pupil data in the memory device 128.

Referring again to step 984, if the value of step 984 equals "no", the method advances to step 990. At step 990, the computer 127 generates second combined synthetic pupil data based on the third and fourth complex pupil data.

At step 992, the computer 127 generates third combined complex pupil data based on the second and fourth complex pupil data.

At step 994, the computer 127 generates fourth combined complex pupil data based on the first and second complex pupil data.

At step 996, the computer 127 stores the second, third, and fourth combined synthetic pupil data in the memory device 128.

Figure 21:
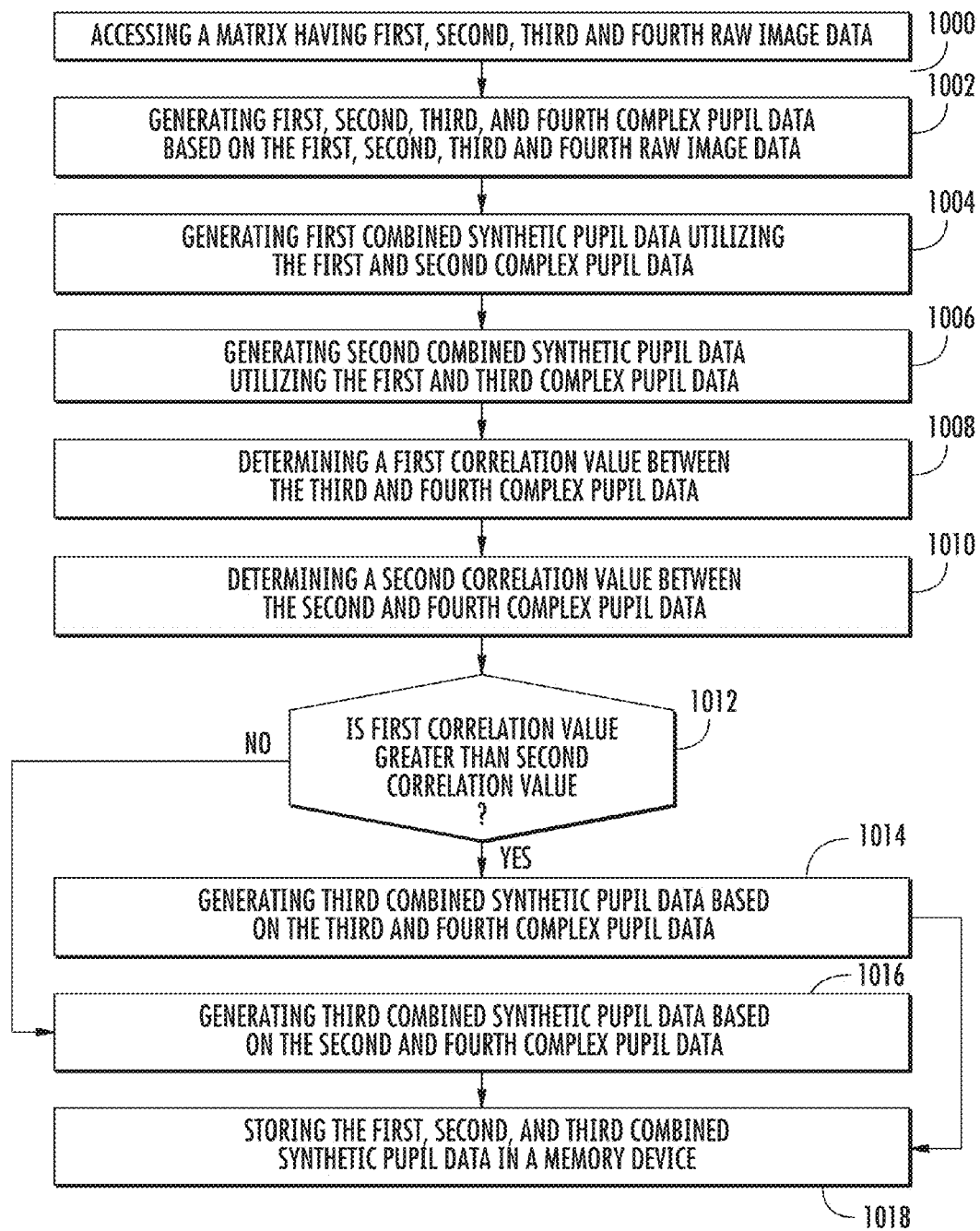
FIG. 21 shows another method for combining image data in accordance with still another aspect of the present invention.

Referring to FIGS. 2, 10 and 21, still yet another alternative method utilized by the recursive algorithm for combining raw image data will now be explained. For purposes of simplicity, when discussing the matrix 238, it will be assumed that only four raw image data components are stored in the matrix 238. Further, the following submethod will be discussed utilizing the imaging system 20.

At step 1000, the memory device 128 stores the matrix 238 with raw image data 356, 358, 366, 368 stored therein. The first row of the matrix 238 has the raw image data 356, 358 therein. The second row of the matrix 238 has the raw image data 366, 368 therein. A first column of the matrix 238 having the raw image data 356, 366 therein. At least of a portion of the raw image data 356, 358 overlap each other, and at least a portion of the raw image data 366, 368 overlap each other. At least a portion of the raw image data 356, 366 overlap each other, and at least a portion of the raw image data 358, 368 overlap each other.

At step 1002, the computer 127 generates first, second, third, and fourth complex pupil data based on the raw image data 356, 358, 366, 368, respectively.

At step 1004, the computer 127 generates first combined synthetic pupil data based on the first and second complex pupil data.

At step 1006, the computer 127 generates second combined synthetic pupil data based on the first and third complex pupil data.

At step 1008, the computer 127 determines a first correlation value between the third and fourth complex pupil data.

At step 1010, the computer 127 determines a second correlation value between the second and fourth complex pupil data.

At step 1012, the computer 127 makes a determination as to whether the first correlation value is greater than the second correlation value. If the value of step 1012 equals "yes", the method advances to step 1014. Otherwise, the method advances to step 1016.

At step 1014, the computer 127 generates third combined synthetic pupil data based on the third and fourth complex pupil data. After step 1014, the method advances to step 1016.

Referring again to step 1012, if the value of step 1012 equals "no", the method advances to step 1016. At step 1016, the computer 127 generates third combined synthetic pupil data based on the second and fourth and fourth complex pupil data.

At step 1018, the computer 127 stores the first, second, and third combined synthetic pupil data in the memory device 128.

The imaging systems and methods disclosed herein provide substantial advantages over other systems and methods. In particular, the imaging systems and methods provide a technical effect of utilizing interference patterns to generate combined synthetic pupil data that can be utilized to generate highly detailed images of remote objects.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. An imaging system for generating synthetic image plane data associated with an object, comprising:

a first laser configured to emit a light beam to illuminate the object;

first and second afocal telescopes configured to collimate and condense first and second light beam portions, respectively, reflected from the object at first and second times, respectively, when the imaging system is at first and second positions, respectively, wherein the first and second afocal telescopes are configured to move to different positions at respective times;

a first beam splitter configured to combine the first light beam portion from the first afocal telescope and a third light beam portion emitted from a second laser to form a first interference pattern;

a second beam splitter configured to combine the second light beam portion from the second afocal telescope and a fourth light beam portion emitted from the second laser to form a second interference pattern;

a first digital camera configured to receive the first interference pattern and to generate first raw image data based on the first interference pattern;

a second digital camera configured to receive the second interference pattern and to generate second raw image data based on the second interference pattern;

a memory device configured to store the first and second raw image data arranged in a matrix format defined by rows and columns with the rows representing raw image data from the first and second afocal telescopes and the columns representing raw image data corresponding to the different positions of the first and second afocal telescopes at the respective times, wherein:

the matrix format provides at least a portion of the first raw image data to spatially overlap at least a portion of the second raw image data, for a particular column in the matrix format, the matrix format provides at least a portion of raw image data in adjacent rows to spatially overlap with each other, and for a particular row in the matrix format, the matrix format provides at least a portion of raw image data in adjacent columns to spatially overlap with each other; and a computer configured to process the first and second raw image data from the memory device to obtain first combined complex synthetic pupil data, and the computer further configured to process the first combined complex synthetic pupil data to generate first synthetic image plane data corresponding to the object.

2. The imaging system of claim 1, wherein the first and second lasers are configured to emit light beams at a same wavelength.

3. The imaging system of claim 1, wherein the computer is further configured to apply a first Fourier transform to the first raw image data to obtain first image plane data;
the computer further configured to select a portion of the first image plane data and to center the portion of the first image plane data and to apply a second Fourier transform to the portion of the first image plane data to obtain first complex pupil data;
the computer further configured to apply a third Fourier transform to the second raw image data to obtain second image plane data;
the computer further configured to select a portion of the second image plane data and to center the portion of the second image plane data and to apply a fourth Fourier transform to the portion of the second image plane data to obtain second complex pupil data; and
the computer further configured to process the first and second complex pupil data to obtain the first combined complex synthetic pupil data.

4. The imaging system of claim 3, wherein the computer is further configured to determine an X-axis offset value, a Y-axis offset value, and a yaw rotation offset value between the first and second complex pupil data.

5. The imaging system of claim 4, wherein the computer is further configured to apply a fifth Fourier transform to the first complex pupil data to obtain the portion of the first image plane data;
the computer further configured to apply a sixth Fourier transform to the second complex pupil data to obtain the portion of the second image plane data; and
the computer further configured to determine a pitch angle offset value and a roll angle offset value between the portion of the first image plane data and the portion of the second image plane data.

6. The imaging system of claim 5, wherein the computer is further configured to determine a Z-axis offset value between the portion of the first image plane data and the portion of the second image plane data.

7. The imaging system of claim 6, wherein the computer is further configured to obtain the first combined complex synthetic pupil data utilizing the first and second complex pupil data, the X-axis offset value, the Y-axis offset value, the Z-axis offset value, the yaw value, the yaw rotation offset value, the pitch angle offset value, and the roll angle offset value.

8. The imaging system of claim 1, wherein the computer is further configured to apply a Fourier transform to the first combined complex synthetic pupil data to generate the first synthetic image plane data corresponding to the object.

9. The imaging system of claim 1, further comprising first and second steering mirrors configured to receive the first and second light beam portions, respectively, that have been reflected from the object and to reflect the first and second light beam portions, respectively, toward the first and second afocal telescopes.

10. A method for generating synthetic image plane data associated with an object, comprising:
emitting a light beam to illuminate the object utilizing a first laser;
collimating and condensing first and second light beam portions utilizing first and second afocal telescopes, respectively, reflected from the object at first and second times, respectively, when the imaging system is at first and second positions, respectively, wherein the first and second afocal telescopes are configured to move to different positions at respective times;
combining the first light beam portion from the first afocal telescope and a third light beam portion emitted from a second laser to form a first interference pattern utilizing a first beam splitter;
combining the second light beam portion from the second afocal telescope and a fourth light beam portion emitted from the second laser to form a second interference pattern utilizing a second beam splitter;
receiving the first interference pattern and generating first raw image data based on the first interference pattern utilizing a first digital camera;
receiving the second interference pattern and generating second raw image data based on the second interference pattern utilizing a second digital camera;
storing the first and second raw image data in a matrix format defined by rows and columns with the rows representing raw image data from the first and second afocal telescopes and the columns representing raw image data corresponding to the different positions of the first and second afocal telescopes at the respective times, wherein:
the matrix format provides at least a portion of the first raw image data to spatially overlap at least a portion of the second raw image data,
for a particular column in the matrix format, the matrix format provides at least a portion of raw image data in adjacent rows to spatially overlap with each other, and
for a particular row in the matrix format, the matrix format provides at least a portion of raw image data in adjacent columns to spatially overlap with each other; and
processing the first and second raw image data to obtain first combined complex synthetic pupil data utilizing a computer, and processing the first combined complex synthetic pupil data to generate first synthetic image plane data corresponding to the object utilizing the computer.

11. An imaging system for generating synthetic image plane data associated with an object, comprising:
a first laser configured to emit a light beam to illuminate the object;
a first afocal telescope configured to collimate and condense first and second light beam portions reflected from the object at the first and second times, respectively, when the imaging system is at first and second positions, respectively, wherein the first afocal telescope is configured to move to different positions at respective times;
a first beam splitter configured to combine the first light beam portion from the first afocal telescope and a third light beam portion emitted from a second laser to form a first interference pattern, the first beam splitter further configured to combine the second light beam portion from the first afocal telescope and a fourth light beam portion emitted from the second laser to form a second interference pattern;
a first digital camera configured to receive the first and second interference patterns and to generate first and second raw image data, respectively, based on the first and second interference patterns, respectively;
a memory device configured to store the first and second raw image data arranged in a matrix format defined by rows and columns with a row in the matrix format representing raw image data from one of a plurality of afocal telescopes and a column of the matrix format representing raw image data corresponding to different positions of the plurality of afocal telescopes at respective times, wherein:

the plurality of afocal telescopes comprises the first afocal telescope, the matrix format provides at least a portion of the first raw image data to spatially overlap at least a portion of the second raw image data, for a particular column in the matrix format, the matrix format provides at least a portion of raw image data in adjacent rows to spatially overlap with each other, and for a particular row in the matrix format, the matrix format provides at least a portion of raw image data in adjacent columns to spatially overlap with each other; and a computer configured to process the first and second raw image data from the memory device to obtain first combined complex synthetic pupil data, and the computer further configured to process the first combined complex synthetic pupil data to generate first synthetic image plane data corresponding to the object.

12. The imaging system of claim 11, wherein the first and second lasers are configured to emit light beams at a same wavelength.

13. The imaging system of claim 11, further comprising:

a second afocal telescope configured to collimate and condense third and fourth light beam portions reflected from the object at the first and second times, respectively, when the imaging system is at the first and second positions, respectively, wherein the plurality of afocal telescopes further comprises the second afocal telescope;

a second beam splitter configured to combine the third light beam portion from the second afocal telescope and a fifth light beam portion emitted from the second laser to form a third interference pattern, the second beam splitter further configured to combine the fourth light beam portion from the second afocal telescope and a sixth light beam portion emitted from the second laser to form a fourth interference pattern;

a second digital camera configured to receive the third and fourth interference patterns and to generate third and fourth raw image data, respectively, based on the third and fourth interference patterns, respectively; and the computer configured to process the third and fourth raw image data to obtain second combined complex synthetic pupil data, and the computer further configured to process the second combined complex synthetic pupil data to generate second synthetic image plane data corresponding to the object.

14. A method for generating synthetic image plane data associated with an object, comprising:

emitting a light beam to illuminate the object utilizing a first laser;

collimating and condensing first and second light beam portions reflected from the object at the first and second times, respectively, when the imaging system is at first and second positions, respectively, utilizing a first afocal telescope, wherein the first afocal telescope is configured to move to different positions at respective times;

combining the first light beam portion from the first afocal telescope and a third light beam portion emitted from a second laser to form a first interference pattern utilizing a first beam splitter, and combining the second light beam portion from the first afocal telescope and a fourth light beam portion emitted from the second laser to form a second interference pattern utilizing the first beam splitter;

generating first and second raw image data, respectively, based on the first and second interference patterns, respectively, utilizing a first digital camera;

storing the first and second raw image data in a matrix format defined by rows and columns with a row in the matrix format representing raw image data from one of a plurality of afocal telescopes and a column of the matrix format representing raw image data corresponding to different positions of the plurality of afocal telescopes at respective times, wherein:

the plurality of afocal telescopes comprises the first afocal telescope, the matrix format provides at least a portion of the first raw image data to spatially overlap at least a portion of the second raw image data, for a particular column in the matrix format, the matrix format provides at least a portion of raw image data in adjacent rows to spatially overlap with each other, and for a particular row in the matrix format, the matrix format provides at least a portion of raw image data in adjacent columns to spatially overlap with each other; and processing the first and second raw image data to obtain first combined complex synthetic pupil data, utilizing a computer, and processing the first combined complex synthetic pupil data to generate first synthetic image plane data corresponding to the object utilizing the computer.

15. An imaging system for generating synthetic image plane data associated with an object, comprising:

a laser configured to emit a light beam to illuminate the object;

first and second afocal telescopes configured to collimate and condense first and second light beam portions, respectively, reflected from the object at the first and second times, respectively, when the imaging system is at first and second positions, respectively, wherein the first and second afocal telescopes are configured to move to different positions at respective times;

a first beam splitter configured to combine the first light beam portion from the first afocal telescope and a third light beam portion emitted from the laser to form a first interference pattern;

a second beam splitter configured to combine the second light beam portion from the second afocal telescope and a fourth light beam portion emitted from the laser to form a second interference pattern;

a first digital camera configured to receive the first interference pattern and to generate first raw image data based on the first interference pattern;

a second digital camera configured to receive the second interference pattern and to generate second raw image data based on the second interference pattern;

a memory device configured to store the first and second raw image data arranged in a matrix format defined by rows and columns with the rows representing raw image data from the first and second afocal telescopes and the columns representing raw image data corresponding to the different positions of the first and second afocal telescopes at the respective times, wherein:

the matrix format provides at least a portion of the first raw image data to spatially overlap at least a portion of the second raw image data, for a particular column in the matrix format, the matrix format provides at least a portion of raw image data in adjacent rows to spatially overlap with each other, and for a particular row in the matrix format, the matrix format provides at least a portion of raw image data in adjacent columns to spatially overlap with each other; and a computer configured to process the first and second raw image data from the memory device to obtain first combined complex synthetic pupil data, and the computer further configured to process the first combined complex synthetic pupil data to generate first synthetic image plane data corresponding to the object.

16. A method for generating synthetic image plane data associated with an object, comprising:

emitting a light beam to illuminate the object utilizing a laser;

collimating and condensing first and second light beam portions, respectively, reflected from the object at the first and second times, respectively, utilizing first and second afocal telescopes, respectively, when the imaging system is at first and second positions, respectively, wherein the first and second afocal telescopes are configured to move to different positions at respective times;

combining the first light beam portion from the first afocal telescope and a third light beam portion emitted from the laser to form a first interference pattern utilizing a first beam splitter;

combining the second light beam portion from the second afocal telescope and a fourth light beam portion emitted from the laser to form a second interference pattern utilizing a second beam splitter;

generating first and second raw image data based on the first and second interference patterns, respectively, utilizing first and second digital cameras, respectively;

storing the first and second raw image data in a matrix format defined by rows and columns with the rows representing raw image data from the first and second afocal telescopes and the columns representing raw image data corresponding to the different positions of the first and second afocal telescopes at the respective times, wherein:

the matrix format provides at least a portion of the first raw image data to spatially overlap at least a portion of the second raw image data, for a particular column in the matrix format, the matrix format provides at least a portion of raw image data in adjacent rows to spatially overlap with each other, and for a particular row in the matrix format, the matrix format provides at least a portion of raw image data in adjacent columns to spatially overlap with each other; and processing the first and second raw image data to obtain first combined complex synthetic pupil data utilizing a computer, and processing the first combined complex synthetic pupil data to generate first synthetic image plane data corresponding to the object utilizing the computer.

17. An imaging system for generating synthetic image plane data associated with an object, comprising:

a laser configured to emit a light beam to illuminate the object;

a first afocal telescope configured to collimate and condense first and second light beam portions reflected from the object at first and second times, respectively, when the imaging system is at first and second positions, respectively, wherein the first afocal telescope is configured to move to different positions at respective times;

a first beam splitter configured to combine the first light beam portion from the first afocal telescope and a third light beam portion emitted from the laser to form a first interference pattern, the first beam splitter further configured to combine the second light beam portion from the first afocal telescope and a fourth light beam portion emitted from the laser to form a second interference pattern;

a first digital camera configured to receive the first and second interference patterns and to generate first and second raw image data, respectively, based on the first and second interference patterns, respectively;

a memory device configured to store the first and second raw image data arranged in a matrix format defined by rows and columns with a row in the matrix format representing raw image data from one of a plurality of afocal telescopes and a column of the matrix format representing raw image data corresponding to different positions of the plurality of afocal telescopes first afocal telescope at respective times, wherein:

the plurality of afocal telescopes comprises the first afocal telescope, the matrix format provides at least a portion of the first raw image data to spatially overlap at least a portion of the second raw image data, for a particular column in the matrix format, the matrix format provides at least a portion of raw image data in adjacent rows to spatially overlap with each other, and for a particular row in the matrix format, the matrix format provides at least a portion of raw image data in adjacent columns to spatially overlap with each other; and a computer configured to process the first and second raw image data from the memory device to obtain first combined complex synthetic pupil data, and the computer further configured to process the first combined complex synthetic pupil data to generate first synthetic image plane data corresponding to the object.

18. The imaging system of claim 17, further comprising:

a second afocal telescope configured to collimate and condense third and fourth light beam portions reflected from the object at the first and second times, respectively, when the imaging system is at the first and second positions, respectively, wherein the plurality of afocal telescopes further comprises the second afocal telescope;

a second beam splitter configured to combine the third light beam portion from the second afocal telescope and a fifth light beam portion emitted from the laser to form a third interference pattern, the second beam splitter further configured to combine the fourth light beam portion from the second afocal telescope and a sixth light beam portion emitted from the laser to form a fourth interference pattern;

a second digital camera configured to receive the third and fourth interference patterns and to generate third and fourth raw image data, respectively, based on the third and fourth interference patterns, respectively; and a computer configured to process the third and fourth raw image data to obtain second combined complex synthetic pupil data, and the computer further configured to process the second combined complex synthetic pupil data to generate second synthetic image plane data corresponding to the object.

19. A method for generating synthetic image plane data associated with an object utilizing an imaging system, comprising:

emitting a light beam to illuminate the object utilizing a laser;

collimating and condensing first and second light beam portions reflected from the object at first and second times, respectively, when the imaging system is at first and second positions, respectively, utilizing a first afocal telescope, wherein the first afocal telescope is configured to move to different positions at respective times;

combining the first light beam portion from the first afocal telescope and a third light beam portion emitted from the laser to form a first interference pattern, utilizing a first beam splitter, and combining the second light beam portion from the first afocal telescope and a fourth light beam portion emitted from the laser to form a second interference pattern, utilizing the first beam splitter;

generating first and second raw image data based on the first and second interference patterns, respectively, utilizing a first digital camera;

storing the first and second raw image data in a matrix format defined by rows and columns with a row in the matrix format representing raw image data from one of a plurality of afocal telescopes and a column of the matrix format representing raw image data corresponding to different positions of the plurality of afocal telescopes at respective times, wherein:

the plurality of afocal telescopes comprises the first afocal telescope, the matrix format provides at least a portion of the first raw image data to spatially overlap at least a portion of the second raw image data, for a particular column in the matrix format, the matrix format provides at least a portion of raw image data in adjacent rows to spatially overlap with each other, and for a particular row in the matrix format, the matrix format provides at least a portion of raw image data in adjacent columns to spatially overlap with each other; and processing the first and second raw image data to obtain first combined complex synthetic pupil data utilizing a computer, and processing the first combined complex synthetic pupil data to generate first synthetic image plane data corresponding to the object utilizing the computer.

20. The method of claim 19, further comprising:

collimating and condensing the third and fourth light beam portions reflected from the object at the first and second times, respectively, when the imaging system is at the first and second positions, respectively, utilizing a second afocal telescope, wherein the plurality of afocal telescopes further comprises the second afocal telescope;

combining the third light beam portion from the second afocal telescope and a fifth light beam portion emitted from the laser to form a third interference pattern utilizing a second beam splitter, and combining the fourth light beam portion from the second afocal telescope and a sixth light beam portion emitted from the laser to form a fourth interference pattern utilizing the second beam splitter;

generating third and fourth raw image data based on the third and fourth interference patterns, respectively, utilizing a first digital camera; and processing the third and fourth raw image data to obtain second combined complex synthetic pupil data utilizing a computer, and processing the second combined complex synthetic pupil data to generate second synthetic image plane data corresponding to the object utilizing the computer.

* * * * *